(12) United States Patent
He et al.

(10) Patent No.: US 9,445,338 B2
(45) Date of Patent: Sep. 13, 2016

(54) RECONFIGURATION CONTROL CHANNEL RESOURCE MAPPING COLLISION AVOIDANCE

(71) Applicant: Intel IP Corporation, Santa Clara, CA (US)

(72) Inventors: Hong He, Beijing (CN); Seunghee Han, Kyoungkido (KR); Jong-Kae Fwu, Sunnyvale, CA (US); Alexey Vladimirovich Khoryaev, Dzerzhinsk (RU)

(73) Assignee: Intel IP Corporation, Santa Clara, CA (US)

( * ) Notice: Subject to any disclaimer, the term of this patent is extended or adjusted under 35 U.S.C. 154(b) by 109 days.

(21) Appl. No.: 14/141,876

(22) Filed: Dec. 27, 2013

(65) Prior Publication Data
US 2014/0301290 A1    Oct. 9, 2014

Related U.S. Application Data

(60) Provisional application No. 61/808,597, filed on Apr. 4, 2013.

(51) Int. Cl.
*H04W 36/30* (2009.01)
*H04L 5/00* (2006.01)
(Continued)

(52) U.S. Cl.
CPC ............... *H04W 36/30* (2013.01); *H04B 1/38* (2013.01); *H04B 7/024* (2013.01); *H04L 5/0007* (2013.01); *H04L 5/0053* (2013.01); *H04L 5/0094* (2013.01); *H04L 5/14* (2013.01); *H04L 12/18* (2013.01); *H04L 43/0823* (2013.01); *H04L 65/1006* (2013.01); *H04L 65/4076* (2013.01); *H04L 65/4092* (2013.01);
(Continued)

(58) Field of Classification Search
None
See application file for complete search history.

(56) References Cited

U.S. PATENT DOCUMENTS 6,445,917 B1    9/2002  Bark et al.
8,619,654 B2   12/2013  Yang et al.
(Continued)

FOREIGN PATENT DOCUMENTS

CN    101971681 A    2/2011
CN    102754496 A   10/2012
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, figure 5.3.3.1-1., [Online]. Retrieved from the Internet.
(Continued)

*Primary Examiner* — Vinncelas Louis
(74) *Attorney, Agent, or Firm* — Schwegman Lundberg & Woessner, P.A.

(57) ABSTRACT

A device includes a transceiver to receive, from a base station, a physical downlink shared channel (PDSCH) transmission and processing circuitry to classify downlink (DL) subframe types for a set of DL subframes associated with a first uplink (UL) subframe for transmission of a hybrid automatic report request acknowledgment (HARQ-ACK) and perform physical uplink control channel (PUCCH) resources mapping based on the classified DL subframe Types for an acknowledgement transmission associated with PDSCH transmission reception.

22 Claims, 9 Drawing Sheets

(51) Int. Cl.
| | |
|---|---|
| H04B 7/02 | (2006.01) |
| H04W 24/02 | (2009.01) |
| H04W 74/08 | (2009.01) |
| H04B 1/38 | (2015.01) |
| H04W 76/00 | (2009.01) |
| H04W 76/02 | (2009.01) |
| H04W 24/08 | (2009.01) |
| H04W 72/04 | (2009.01) |
| H04L 12/26 | (2006.01) |
| H04W 4/00 | (2009.01) |
| H04W 68/02 | (2009.01) |
| H04L 12/18 | (2006.01) |
| H04L 29/06 | (2006.01) |
| H04L 29/08 | (2006.01) |
| H04W 8/00 | (2009.01) |
| H04W 56/00 | (2009.01) |
| H04W 72/12 | (2009.01) |
| H04L 5/14 | (2006.01) |
| H04B 7/04 | (2006.01) |
| H04B 7/06 | (2006.01) |
| H04W 76/04 | (2009.01) |
| H04W 76/06 | (2009.01) |
| H04W 84/12 | (2009.01) |
| H04W 84/04 | (2009.01) |
| H04W 88/02 | (2009.01) |
| H04W 92/20 | (2009.01) |

(52) U.S. Cl.
CPC .......... *H04L 67/02* (2013.01); *H04L 67/1076* (2013.01); *H04W 4/005* (2013.01); *H04W 8/005* (2013.01); *H04W 24/02* (2013.01); *H04W 24/08* (2013.01); *H04W 56/001* (2013.01); *H04W 68/02* (2013.01); *H04W 72/042* (2013.01); *H04W 72/0446* (2013.01); *H04W 72/0486* (2013.01); *H04W 72/1263* (2013.01); *H04W 74/0808* (2013.01); *H04W 76/00* (2013.01); *H04W 76/022* (2013.01); *H04W 76/025* (2013.01); *H04W 76/04* (2013.01); *H04W 76/046* (2013.01); *H04W 76/048* (2013.01); *H04W 76/06* (2013.01); *H04B 7/0456* (2013.01); *H04B 7/0639* (2013.01); *H04W 76/041* (2013.01); *H04W 76/068* (2013.01); *H04W 84/045* (2013.01); *H04W 84/12* (2013.01); *H04W 88/02* (2013.01); *H04W 92/20* (2013.01)

(56) References Cited

U.S. PATENT DOCUMENTS

| | | | |
|---|---|---|---|
| 8,818,376 | B2 | 8/2014 | Yiu et al. |
| 9,160,515 | B2 | 10/2015 | Yiu et al. |
| 9,191,178 | B2 | 11/2015 | Koc et al. |
| 2002/0163933 | A1 | 11/2002 | Benveniste |
| 2009/0040955 | A1 | 2/2009 | Jung et al. |
| 2009/0059871 | A1 | 3/2009 | Nader et al. |
| 2009/0124261 | A1 | 5/2009 | Shimomura |
| 2009/0245182 | A1 | 10/2009 | Abraham et al. |
| 2009/0323638 | A1 | 12/2009 | Catovic et al. |
| 2010/0113008 | A1 | 5/2010 | Wang et al. |
| 2010/0130237 | A1 | 5/2010 | Kitazoe et al. |
| 2011/0007673 | A1 | 1/2011 | Ahn et al. |
| 2011/0019776 | A1 | 1/2011 | Zhang et al. |
| 2011/0235602 | A1* | 9/2011 | Ji et al. .......................... 370/329 |
| 2011/0243039 | A1* | 10/2011 | Papasakellariou et al. .. 370/280 |
| 2011/0256861 | A1 | 10/2011 | Yoo et al. |
| 2011/0261729 | A1* | 10/2011 | Ahn et al. ..................... 370/280 |
| 2011/0263262 | A1 | 10/2011 | Min et al. |
| 2012/0120908 | A1 | 5/2012 | Ahn et al. |
| 2012/0127938 | A1 | 5/2012 | Lv et al. |
| 2012/0163296 | A1 | 6/2012 | Cheon et al. |
| 2012/0275365 | A1 | 11/2012 | Anderson et al. |
| 2012/0300738 | A1 | 11/2012 | Palanki et al. |
| 2012/0327821 | A1 | 12/2012 | Lin et al. |
| 2013/0010769 | A1 | 1/2013 | Kang et al. |
| 2013/0028235 | A1 | 1/2013 | Barrett |
| 2013/0044652 | A1 | 2/2013 | Wang et al. |
| 2013/0051214 | A1 | 2/2013 | Fong et al. |
| 2013/0051338 | A1 | 2/2013 | Ryu et al. |
| 2013/0100895 | A1 | 4/2013 | Aghili et al. |
| 2013/0196664 | A1 | 8/2013 | Yiu et al. |
| 2013/0272148 | A1 | 10/2013 | Fong et al. |
| 2013/0279372 | A1 | 10/2013 | Jain et al. |
| 2013/0303231 | A1 | 11/2013 | Yiu et al. |
| 2013/0324174 | A1 | 12/2013 | Mueck |
| 2014/0301288 | A1 | 10/2014 | Koc et al. |
| 2014/0301354 | A1 | 10/2014 | Davydov et al. |
| 2014/0302851 | A1 | 10/2014 | Yiu et al. |
| 2014/0302887 | A1 | 10/2014 | Bashar et al. |
| 2015/0078335 | A1 | 3/2015 | Sivanesan et al. |
| 2015/0111581 | A1 | 4/2015 | Yiu et al. |
| 2015/0189658 | A1* | 7/2015 | Zhang .................. H04B 7/0482 370/280 |

FOREIGN PATENT DOCUMENTS

| | | |
|---|---|---|
| EP | 2434818 A1 | 3/2012 |
| EP | 2533589 A1 | 12/2012 |
| EP | 2568758 A1 | 3/2013 |
| TW | 201141288 A | 11/2011 |
| TW | 201445961 A | 12/2014 |
| TW | 201446056 A | 12/2014 |
| WO | WO-2008112126 A1 | 9/2008 |
| WO | WO-2010133043 A1 | 11/2010 |
| WO | WO-2011020062 A2 | 2/2011 |
| WO | WO-2011119680 A2 | 9/2011 |
| WO | WO-2011119750 A1 | 9/2011 |
| WO | WO-2011156967 | 12/2011 |
| WO | WO-2012111993 A2 | 8/2012 |
| WO | WO-2012148195 A2 | 11/2012 |
| WO | WO-2012149898 A1 | 11/2012 |
| WO | WO-2014158268 A1 | 10/2014 |
| WO | WO-2014163686 A1 | 10/2014 |
| WO | WO-2014163690 A1 | 10/2014 |
| WO | WO-2014165517 A1 | 10/2014 |
| WO | WO-2014165603 A1 | 10/2014 |
| WO | WO-2014165656 A1 | 10/2014 |
| WO | WO-2014165657 A1 | 10/2014 |
| WO | WO-2014165690 A1 | 10/2014 |

OTHER PUBLICATIONS

"3rd Generation Partnership Project; Technical Specification Group Services and System Aspects; Architecture enhancements to facilitate communications with packet data networks and applications (Release 12)", 3GPP TS 23.682 V12.0.0, (Dec. 2013), 33 pgs.

"3rd Generation Partnership Project; Technical Specification Group Services and System Aspects; Feasibility study on 3GPP system to Wireless Local Area Network (WLAN) interworking (Release 12)", 3GPP TR 22.934 V12.0.0, (Oct. 2014), 30 pgs.

"3rd Generation Partnership Project; Technical Specification Group Services and System Aspects; Machine-Type and other Mobile Data Applications Communications Enhancements (Release 12)", 3GPP TR 23.887 V0.8.0, (Feb. 2013), 107 pgs.

"6.3.2—Radio resource control information elements", ETSI TS 136 331 V11.5.0: LTE; Evolved Universal Terrestrial Radio Access (E-UTRA); Radio Resource Control (RRC); Protocol specification (3GPP TS 36.331 version 11.5.0 Release 11), (Sep. 2013), 187-231.

"7.6.1—Introduction", ETSI TS 136 133 V11.6.0: LTE; Evolved Universal Terrestrial Radio Access (E-UTRA); Requirements for support of radio resource management (3GPP TS 36.133 version 11.6.0 Release 11), (Oct. 2013), 58-59.

"U.S. Appl. No. 14/107,947, Non Final Office Action mailed May 1, 2015", 17 pgs.

"U.S. Appl. No. 14/107,947, Notice of Allowance mailed May 15, 2015", 15 pgs.

(56) References Cited

OTHER PUBLICATIONS

"U.S. Appl. No. 14/140,932, Notice of Allowance mailed Jun. 25, 2015", 9 pgs.
"International Application Serial No. PCT/US2013/075726, International Search Report mailed Apr. 10, 2014", 3 pgs.
"International Application Serial No. PCT/US2013/075726, Written Opinion mailed Apr. 10, 2014", 5 pgs.
"International Application Serial No. PCT/US2013/077163, International Search Report mailed Apr. 25, 2014", 3 pgs.
"International Application Serial No. PCT/US2013/077163, Written Opinion mailed Apr. 25, 2014", 8 pgs.
"International Application Serial No. PCT/US2013/077255, International Search Report mailed Apr. 21, 2014", 3 pgs.
"International Application Serial No. PCT/US2013/077255, Written Opinion mailed Apr. 21, 2014", 6 pgs.
"International Application Serial No. PCT/US2014/032532, International Search Report mailed Jul. 24, 2014", 3 pgs.
"International Application Serial No. PCT/US2014/032532, Written Opinion mailed Jul. 24, 2014", 4 pgs.
"International Application Serial No. PCT/US2014/032697, International Search Report mailed Aug. 22, 2014", 4 pgs.
"International Application Serial No. PCT/US2014/032697, Written Opinion mailed Aug. 22, 2014", 5 pgs.
"International Application Serial No. PCT/US2014/032795, International Search Report mailed Aug. 19, 2014", 3 pgs.
"International Application Serial No. PCT/US2014/032795, Written Opinion mailed Aug. 19, 2014", 7 pgs.
"International Application Serial No. PCT/US2014/032797, International Search Report mailed Aug. 7, 2014", 3 pgs.
"International Application Serial No. PCT/US2014/032797, Written Opinion mailed Aug. 7, 2014", 4 pgs.
"International Application Serial No. PCT/US2014/032855, International Search Report mailed Aug. 13, 2014", 3 pgs.
"International Application Serial No. PCT/US2014/032855, Written Opinion mailed Aug. 13, 2014", 5 pgs.
"Study on RAN aspects of Machine-Type and other mobile data applications Communications enhancements", 3GPP TSG-RAN Meeting #59: RP-130396, (2013), 5 pgs.
"Taiwanese Application Serial No. 103112303, Office Action mailed Apr. 17, 2015", 8 pgs.
"Taiwanese Application Serial No. 103112307, Office Action mailed May 21, 2015", 8 pgs.
"Technical Specification 3rd Generation Partnership Project; Technical Specification Group Radio Access Network; Evolved Universal Terrestrial Radio Access (E-UTRA); LTE physicallayer; General description (Release 11), hereinafter TS36.201", 3GPP TS 36.201 V11.1.0, (Dec. 2012).
"Technical Specification 3rd Generation Partnership Project; Technical Specification Group Radio Access Network; Evolved Universal Terrestrial Radio Access (E-UTRA);Radio Resource Control (RRC); Protocol specification (Release10), hereinafter TS36.331", 3GPP TS 36.331 V10.8.0, (Dec. 2012).
"Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V11.4.0 (Release 11), (Dec. 2012), 208 pgs.
Electronics, LG, "Initial evaluation of DM-RS reduction for small cell", R1-130266, 3GPP TSG RAN WG1 Meeting #72, (2013).
Incorporated, QUALCOMM, "Overhead reduction", R1-130594, 3GPP TSG RAN WG1 #72, (2013).
Samsung, "Evaluation assumptions for Interference control among small cells", R1-130301, 3GPP TSG-RAN WG1 #72, (2013).
ZTE, "Downlink DMRS redunction for small cell", R1-130138, 3GPP TSG RAN WG1 Meeting #72, (2013).
U.S. Appl. No. 14/779,024, filed Sep. 22, 2015, Extended Paging Discontinuous Reception (DRX) Cycles in Wireless Communication Networks.
U.S. Appl. No. 14/777,122, filed Sep. 15, 2015, Radio Link Monitoring for EPDCCH.
U.S. Appl. No. 14/845,019, filed Sep. 3, 2015, User Equipment and Methods for Handover Enhancement Using Scaled Time-To-Trigger and Time-Of-Stay.
U.S. Appl. No. 14/918,990, filed Oct. 21, 2015, Enhanced Node B and Method for RRC Connection Establishment for Small Data Transfers.
"U.S. Appl. No. 14/141,179, Examiner Interview Summary mailed Oct. 8, 2015", 3 pgs.
"U.S. Appl. No. 14/141,179, Non Final Office Action mailed Aug. 25, 2015", 15 pgs.
"U.S. Appl. No. 14/141,179, Response filed Nov. 23, 2015 to Non Final Office Action mailed Aug. 25, 2015", 12 pgs.
"U.S. Appl. No. 14/777,122, Preliminary Amendment filed Sep. 15, 2015", 8 pgs.
"U.S. Appl. No. 14/778,801, Preliminary Amendment filed Sep. 21, 2015", 7 pgs.
"International Application Serial No. PCT/US2013/075726, International Preliminary Report on Patentability mailed Oct. 15, 2015", 7 pgs.
"International Application Serial No. PCT/US2013/077163, International Preliminary Report on Patentability mailed Oct. 15, 2015", 10 pgs.
"International Application Serial No. PCT/US2013/077255, International Preliminary Report on Patentability mailed Oct. 8, 2015", 8 pgs.
"International Application Serial No. PCT/US2014/032532, International Preliminary Report on Patentability mailed Oct. 15, 2015", 6 pgs.
"International Application Serial No. PCT/US2014/032697, International Preliminary Report on Patentability mailed Oct. 15, 2015", 7 pgs.
"International Application Serial No. PCT/US2014/032795, International Preliminary Report on Patentability mailed Oct. 15, 2015", 9 pgs.
"International Application Serial No. PCT/US2014/032797, International Preliminary Report on Patentability mailed Oct. 15, 2015", 7 pgs.
"International Application Serial No. PCT/US2014/032855, International Preliminary Report on Patentability mailed Oct. 15, 2015", 7 pgs.
"Taiwanese Application Serial No. 103111024, Office Action mailed Jul. 23, 2015", w/ English Translation, 11 pgs.
"Taiwanese Application Serial No. 103111024, Response filed Oct. 6, 2015 to Office Action mailed Jul. 23, 2015", w/ English Claims, 19 pgs.
"Taiwanese Application Serial No. 103112289, Office Action mailed Aug. 12, 2015", w/ English Translation, 11 pgs.
"Taiwanese Application Serial No. 103112289, Response filed Nov. 11, 2015 to Office Action mailed Aug. 12, 2015", w/ English Translation, 16 pgs.
"Taiwanese Application Serial No. 103112303, Response filed Jul. 17, 2015 to Office Action mailed Apr. 17, 2015", w/ English Translation, 46 pgs.

\* cited by examiner

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

| ACK/NACK RESOURCE OFFSET FIELD IN DCI FORMAT 1A/1B/1D/1/2A/2/2B/2C/2D | $\Delta_{ARO}$ |
|---|---|
| 0 | 0 |
| 1 | $\Delta_1-2$ |
| 2 | $\Delta_1-1$ |
| 3 | 2 |

| VALUE OF 'TPC COMMAND FOR PUCCH' | $n_{PUCCH}^{(1,p)}$ |
|---|---|
| '00' | THE FIRST PUCCH RESOURCE VALUE CONFIGURED BY THE HIGHER LAYERS |
| '01' | THE SECOND PUCCH RESOURCE VALUE CONFIGURED BY THE HIGHER LAYERS |
| '10' | THE THIRD PUCCH RESOURCE VALUE CONFIGURED BY THE HIGHER LAYERS |
| '11' | THE FOURTH PUCCH RESOURCE VALUE CONFIGURED BY THE HIGHER LAYERS |

*FIG. 8*

| VALUE OF 'TPC COMMAND FOR PUCCH' OR 'HARQ-ACK RESOURCE OFFSET' | $n_{PUCCH}^{(3,\tilde{p})}$ |
|---|---|
| '00' | THE FIRST PUCCH RESOURCE VALUE CONFIGURED BY THE HIGHER LAYERS |
| '01' | THE SECOND PUCCH RESOURCE VALUE CONFIGURED BY THE HIGHER LAYERS |
| '10' | THE THIRD PUCCH RESOURCE VALUE CONFIGURED BY THE HIGHER LAYERS |
| '11' | THE FOURTH PUCCH RESOURCE VALUE CONFIGURED BY THE HIGHER LAYERS |

*FIG. 9*

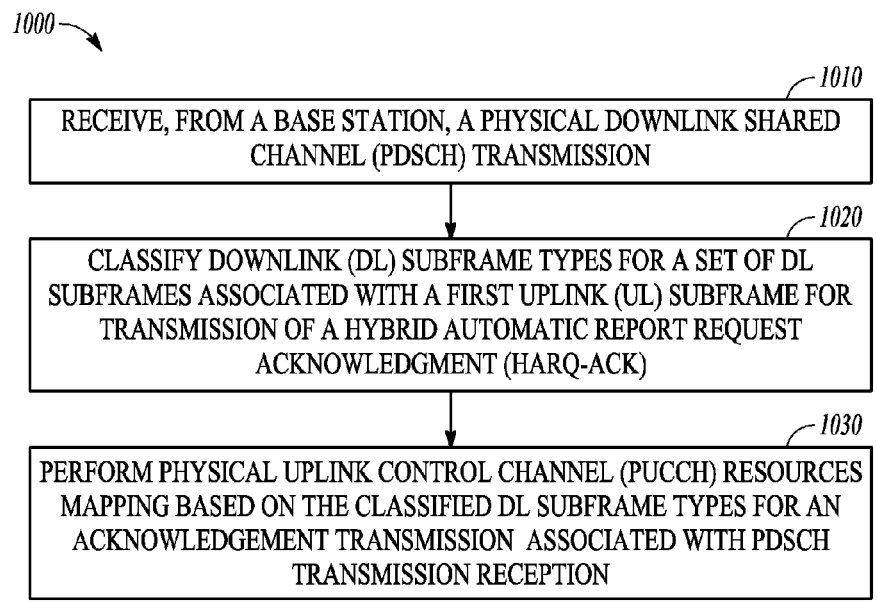

*FIG. 10*

RECONFIGURATION CONTROL CHANNEL RESOURCE MAPPING COLLISION AVOIDANCE

RELATED APPLICATION

This application claims priority to U.S. Provisional Application Ser. No. 61/808,597 (entitled PATTERN INDICATOR SIGNAL FOR NEW DMRS PATTERN, filed Apr. 4, 2013) which is incorporated herein by reference in its entirety.

BACKGROUND

LTE (long term evolution) communications continue to evolve, with more and more releases designed to optimize bandwidth utilization and throughput performance. The use of user equipment (UE) continues to grow, taxing the ability of communication systems to handle concomitant increases in bandwidth demand.

BRIEF DESCRIPTION OF THE DRAWINGS

FIG. 8 is a table utilized to determine the value of $n_{PUCCH,i}^{(1)}$ according to higher layer configuration for a PDSCH transmission where there is not a corresponding PDCCH/EPDCCH detected in subframe $n-k_i$ according to an example embodiment.

FIG. 9 is a table utilized to determine the value of $n_{PUCCH}^{(3,\tilde{p})}$ according to higher layer configuration according to an example embodiment.

FIG. 10 is a flowchart illustrating a method of physical uplink control channel (PUCCH) resources mapping according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
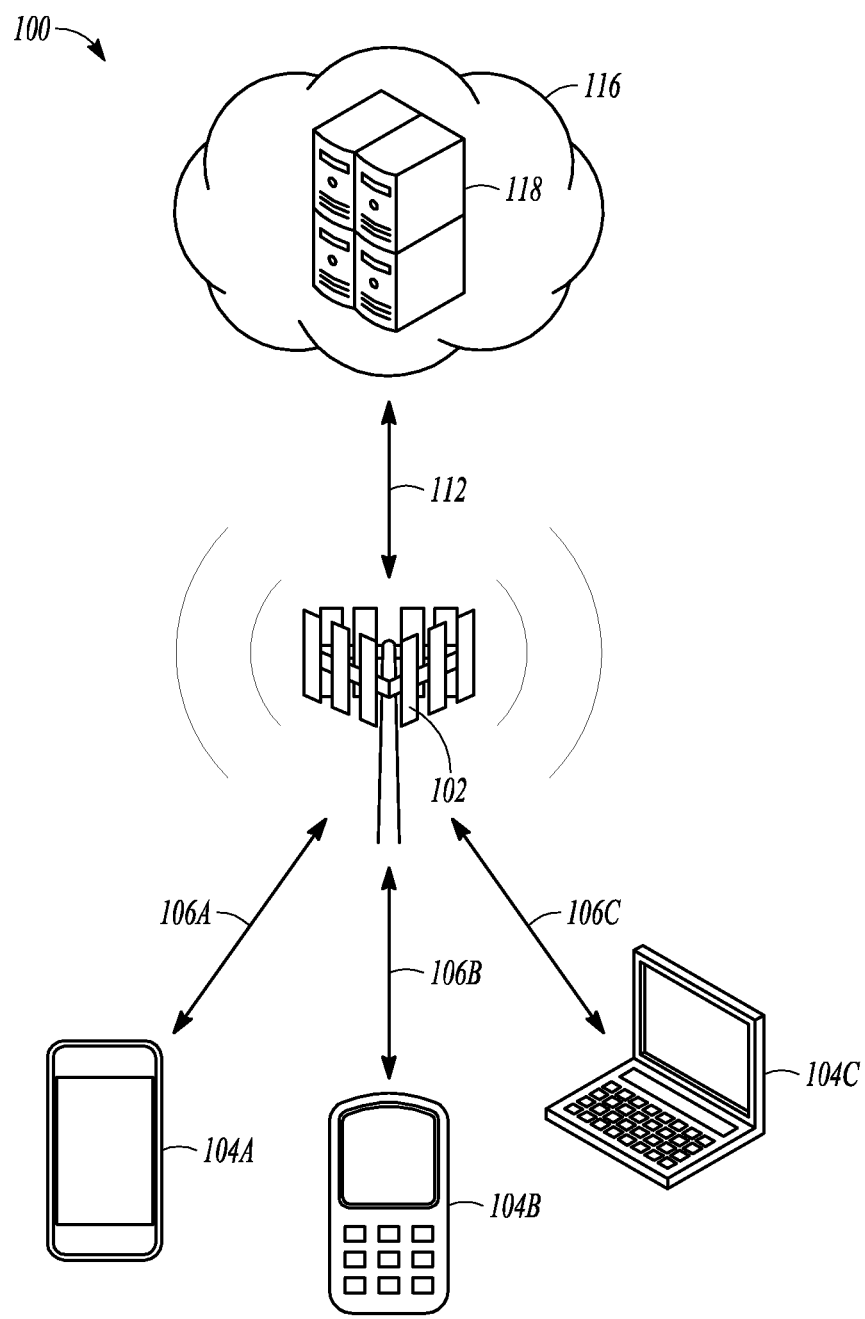
FIG. 1 is an illustration of an example configuration of a communication network architecture according to an example embodiment.

FIG. 1 is an illustration of an example configuration of a communication network architecture 100, in accordance with some embodiments. Within the communication network architecture 100, a carrier-based network such as an IEEE 802.11 compatible wireless access point or a LTE/LTE-A cell network operating according to a standard from a 3GPP standards family is established by network equipment 102. The network equipment 102 may include a wireless access point, a Wi-Fi hotspot, or an enhanced or evolved node B (eNodeB) communicating with communication devices 104A, 104B, 104C (e.g., a user equipment (UE) or a communication station (STA)). The carrier-based network includes wireless network connections 106A, 106B, and 106C with the communication devices 104A, 104B, and 104C, respectively. The communication devices 104A, 104B, 104C are illustrated as conforming to a variety of form factors, including a smartphone, a mobile phone handset, and a personal computer having an integrated or external wireless network communication device.

The network equipment 102 is illustrated in FIG. 1 as being connected via a network connection 114 to network servers 118 in a cloud network 116. The servers 118, or any one individual server, may operate to provide various types of information to, or receive information from, communication devices 104A, 104B, 104C, including device location, user profiles, user information, web sites, e-mail, and the like. The techniques described herein enable the determination of the location of the various communication devices 104A, 104B, 104C, with respect to the network equipment 102.

Communication devices 104A, 104B, 104C may communicate with the network equipment 102 when in range or otherwise in proximity for wireless communications. As illustrated, the connection 106A may be established between the mobile device 104A (e.g., a smartphone) and the network equipment 102; the connection 106B may be established between the mobile device 104B (e.g., a mobile phone) and the network equipment 102; and the connection 106C may be established between the mobile device 104C (e.g., a personal computer) and the network equipment 102.

The wireless communications 106A, 106B, 106C between devices 104A, 104B, 104C may utilize a Wi-Fi or IEEE 802.11 standard protocol, or a protocol such as the current 3rd Generation Partnership Project (3GPP) long term evolution (LTE) time division duplex (TDD)-Advanced systems. In an embodiment, the communications network 116 and network equipment 102 comprises an evolved universal terrestrial radio access network (EUTRAN) using the 3rd Generation Partnership Project (3GPP) long term evolution (LTE) standard and operating in time division duplexing (TDD) mode. The devices 104A, 104B, 104C may include one or more antennas, receivers, transmitters, or transceivers that are configured to utilize a Wi-Fi or IEEE 802.11 standard protocol, or a protocol such as 3GPP, LTE, or LTE TDD-Advanced or any combination of these or other communications standards.

Antennas in or on devices 104A, 104B, 104C may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to utilize spatial diversity and the different channel characteristics that may result between each of the antennas and the antennas of a transmitting station. In some MIMO embodiments, antennas may be separated by up to 1/10 of a wavelength or more.

In some embodiments, the mobile device 104A may include one or more of a keyboard, a display, a non-volatile memory port, multiple antennas, a graphics processor, an application processor, speakers, and other mobile device elements. The display may be an LCD screen including a touch screen. The mobile device 104B may be similar to mobile device 104A, but does not need to be identical. The mobile device 104C may include some or all of the features, components, or functionality described with respect to mobile device 104A.

A base station, such as an enhanced or evolved node B (eNodeB), may provide wireless communication services to communication devices, such as device 104A. While the exemplary communication system 100 of FIG. 1 depicts only three devices users 104A, 104B, 104C any combination of multiple users, devices, servers and the like may be coupled to network equipment 102 in various embodiments. For example, three or more users located in a venue, such as a building, campus, mall area, or other area, and may utilize any number of mobile wireless-enabled computing devices to independently communicate with network equipment 102. Similarly, communication system 100 may include more than one network equipment 102. For example, a plurality of access points or base stations may form an overlapping coverage area where devices may communicate with at least two instances of network equipment 102.

Although communication system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

A new Rel-12 LTE WID on "Further Enhancements to LTE TDD for uplink/downlink (UL/DL) Interference Management and Traffic Adaptation" was recently agreed upon. The main objective is to enable TDD UL/DL reconfiguration for traffic adaptation for TD-LTE system, including clustered small cells deployment. Unlike a legacy (e.g. Rel-8) eNB with semi-static UL/DL configuration, the duplex direction of flexible subframes in a cell supporting Rel-12 eIMTA feature can be changed dynamically. A number of signaling options have been extensively discussed during the eIMTA SI phase, including system information block (SIB), paging, radio resource control (RRC), medium access layer (MAC) and Physical layer signaling, characteristic with supporting different traffic adaptation time scales.

Figure 2:
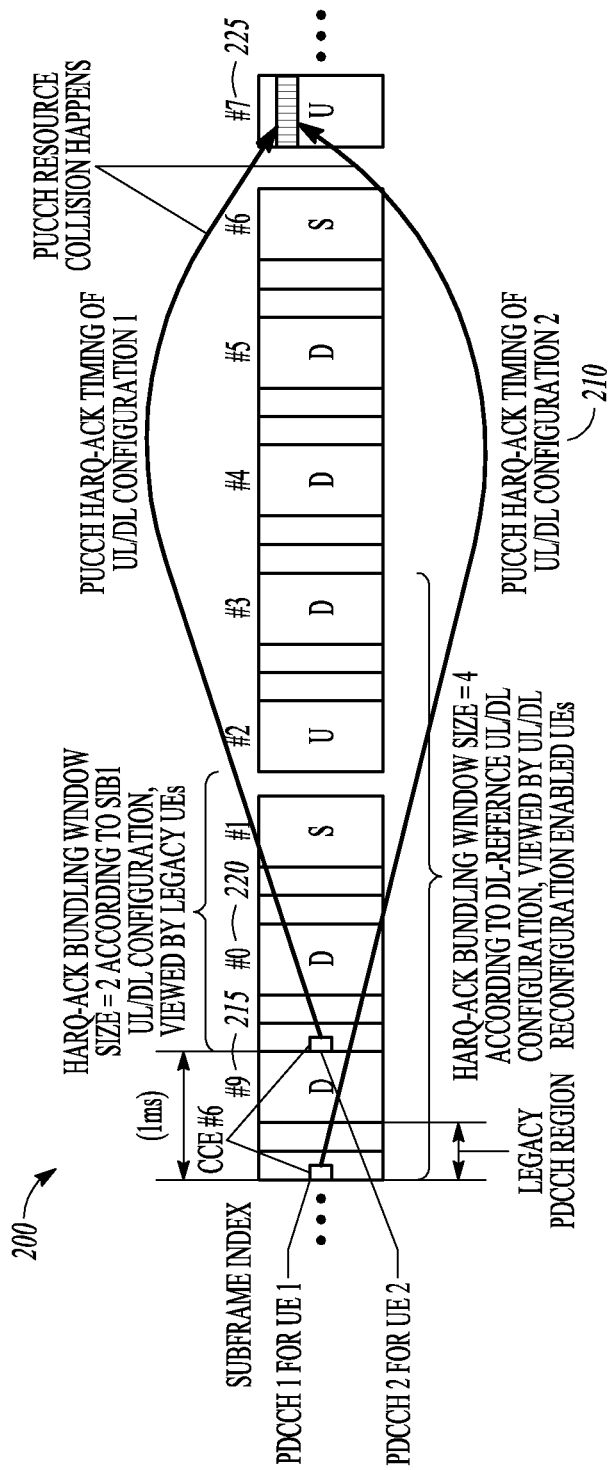
FIG. 2 is a timing diagram illustrating a physical uplink control channel (PUCCH) resource collision issue according to an example embodiment.
Figures 3, 4:
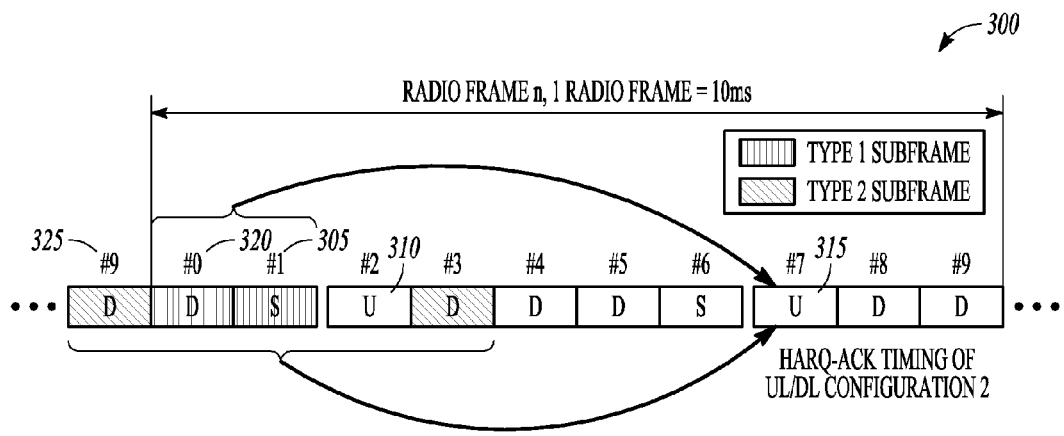
FIG. 3 is a timing diagram illustrating a UL/DL configuration 2 achieved by flexibly changing the transmission direction of subframes #3 and #8 from UL to DL to meet instant traffic conditions according to an example embodiment.
FIG. 4 is a table identifying a downlink association set index K for TDD according to the DL-reference UL/DL configuration Table 10.1.3.1-1 in 3GPP Rel. 11 according to an example embodiment.

One physical uplink control channel (PUCCH) resource collision issue arising from UL/DL reconfiguration feature, regardless of SIB/paging/RRC/MAC/L1 signaling, was observed. An example of this issue is shown in FIG. 2 at 200. TDD UL/DL configuration 1 is assumed to be indicated in SystemInformationBlockType1 (SIB1), but the actual TDD UL-DL configuration, is UL/DL configuration 2 as indicated at 210, which is achieved by flexibly changing the transmission direction of subframes #3 and #8 from UL to DL to meet instant traffic conditions and consequently maximize the radio spectrum efficiency as seen in FIG. 3 at 310 and 315 respectively. The DL-reference UL/DL configuration is known by Rel-12 UL/DL reconfiguration capable UE so that UE can utilize the flexible subframe resources. In addition, UE can properly determine the hybrid automatic repeat request-acknowledgement (HARQ-ACK) timeline for physical dedicated shared channel (PDSCH) transmission according to DL-reference UL/DL configuration. In this example, DL-reference UL/DL configuration is assumed to be TDD UL/DL configuration 2. It can be seen that the PUCCH resources associated with the two PDCCHs—PDCCH 1 in subframe #9 at 215 within radio frame n−1 for UE1 and PDCCH 2 in subframe #0 at 220 within radio frame n for UE2 are collided in the same PUCCH 1a/1b resource at the UL subframe #7 at 225 in radio frame n. The reason for this is that the same number of the first control channel element (CCE) index, $n_{CCE,m}=6$, is used by two PDCCHs and two different PDSCH HARQ-ACK timing relationship are assumed at UE1 and UE2 separately. As a consequence, the implicitly mapped PUCCH resources are exactly the same at two UEs according to the equation below:

$$n_{PUCCH,i}^{(1)} = (M-m-1) \cdot N_c + m \cdot N_{c+1} + n_{CCE,m} + N_{PUCCH}^{(1)}$$

Where $n_{CCE,m}$ is the number of the first CCE used for transmission of the corresponding PDCCH in subframe. This is a common PUCCH resource collision issue for all TDD UL/DL re-configuration signaling methods. Two solutions are proposed to address it.

In one embodiment, the PDSCH subframes are firstly classified into two types—Type 1 and Type 2. After classification of the subframes, PUCCH resource mapping is performed based on DL subframe types. Additionally, to avoid excessive control overhead, the ARO (i.e. HARQ-ACK resource offset field) may be used to compress the PUCCH region.

There has been no known solution for PUCCH resource mapping scheme for UL-DL reconfiguration supporting in Rel-12, targeting for PUCCH resource mapping collision avoidance.

In one embodiment, the downlink subframes associated with an uplink subframe for HARQ-ACK feedback are classified into two types (i.e. Type 1 and Type 2) according to the TDD UL/DL configuration contained in SIB1 message and the DL-reference UL/DL configuration indicated by higher layer signaling as below:

Type 1 subframes are DL subframes that associated with a UL subframe n for HARQ-ACK feedback according to the SIB1 TDD UL/DL configuration.

Type 2 subframes are the DL subframes that are constructed with a two-step approach:

Step-1: Type 2 subframes are DL subframes associated with the UL subframe n for HARQ-ACK feedback according to a higher layer configured DL-reference UL/DL configuration. This configuration can be either implicitly determined based on TDD UL/DL configurations of two consecutive radio frames as documented in previous IDF [1] or explicitly indicated by higher-layer signaling.

Step-2: if the Type 1 subframes are overlapped with the Type 2 subframes that have been constructed in Step-1, the overlapping subframes will be further removed from Type 2 subframes.

In one embodiment as shown in FIG. 3 at 300, assuming that TDD configuration 1 is indicated in SIB1, while the DL-reference UL/DL configuration is configuration #2, then Type 1 subframes include subframe #1 at 305 and #0 at 310 in radio frame n. While, Type 2 subframes comprise of subframe #3 at 320 in radio frame n and subframe #9 at 325 in radio frame n−1.

Solution 1: PUCCH format 1b with Channel Selection (CS). To address the potential PUCCH resource collision issue, one hybrid PUCCH resource mapping method includes the following. Let M denote the number of elements in the set K defined in Table 10.1.3.1-1 in 3GPP Rel. 11 as shown at 400 in FIG. 4 identifying a downlink association set index K for TDD according to the DL-reference UL/DL configuration. The Set K is further divided into two sets: $K_1$ and $K_2$, each of which is comprised of a number of subframes in set K. The set $K_1$ includes all Type 1 subframe and set $K_2$ includes all Type 2 subframe. $M=M_1+M_2$, where $M_1$ and $M_2$ denotes the number of DL subframes in set $K_1$ and $K_2$ respectively.

Let n CCH,j denote the PUCCH resource derived from sub-frame $n-k_i$ and HARQ-ACK(i) as the ACK/NACK/DTX response from sub-frame $n-k_i$ according to DL-reference UL/DL configuration, where $k_i \in K$, and $0 \le i \le M-1$. Let j denote the position of subframe $n-k_i$ within the set $K_1$ in an increasing order of i value from j=0, where $0 \le j \le M_1-1$, and let 1 denote the position of subframe $n-k_i$ within the set $K_2$ in an increasing order of i value from l=0, where $0 \le l \le M_2-1$.

Figures 5, 6:
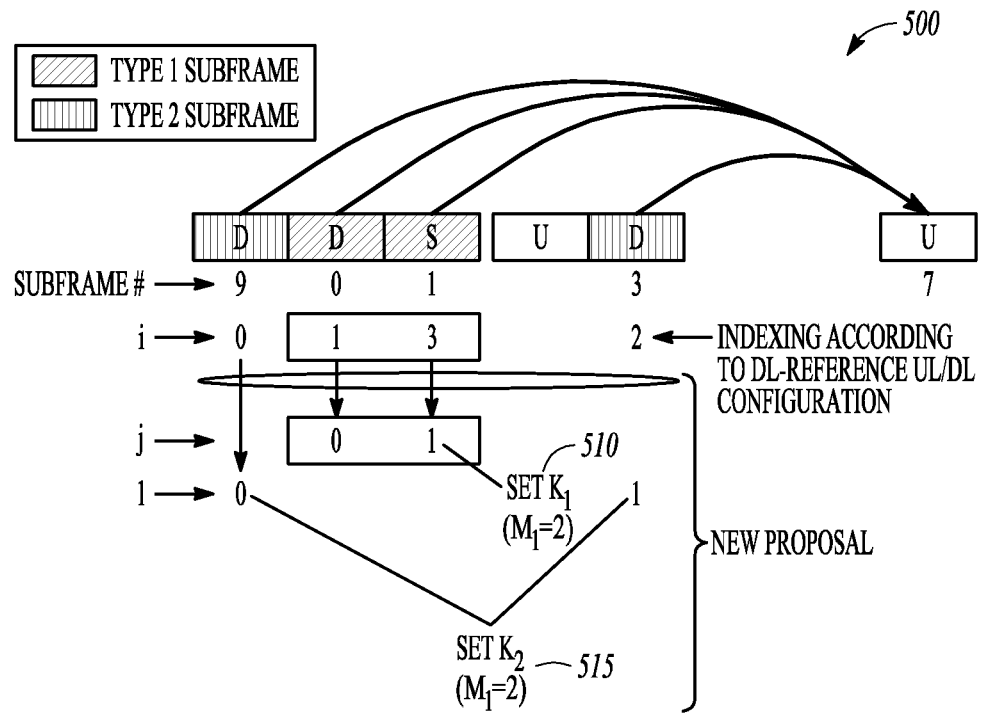
FIG. 5 is a table identifying j and l values for DL subframe within set K that associated with subframe 7 for HARQ-ACK feedback according to an example embodiment.
FIG. 6 is a table identifying a HARQ-ACK resource offset field in the DCI format of the corresponding EPDCCH according to an example embodiment.

In one embodiment, assuming SIB1 TDD UL/DL configuration is configuration 1, and DL-reference UL/DL configuration is configuration 2, the corresponding j and l values for DL subframe within set K that associated with subframe 7 for HARQ-ACK feedback are shown at 500 in FIG. 5 with an example of DL subframe indexing across set $K_1$ at 510 and $K_2$ at 515.

After PDSCH subframes are indexed within the corresponding set, PUCCH resources mapping is performed as follows: For a PDSCH transmission indicated by the detection of corresponding PDCCH or a PDCCH indicating downlink SPS release in subframe $n-k_i$, if it corresponds to Type 1 subframe j ($0 \le j \le M_1-1$), the PUCCH resource $$n_{PUCCH,j}^{(1)} = (M_1-j-1)\cdot N_c + j\cdot N_{c+1} + n_{CCE,j} + N_{PUCCH}^{(1)} \quad (1\text{-}0)$$

If it corresponds to Type 2 subframe 1 ($0 \le l \le M_2-1$), the PUCCH resource:

$$n_{PUCCH,l}^{(1)} = (M_2-l-1)\cdot N_c + l\cdot N_{c+1} + n_{CCE,l} + N_{PUCCH}^{(2)} \quad (2\text{-}0)$$

or $$n_{PUCCH,l}^{(1)} = l\cdot N_4 + n_{CCE,l} + N_{PUCCH}^{(2)} \quad (3\text{-}0)$$

or $$n_{PUCCH,l}^{(1)} = \sum_{c=0}^{l-1}\sum_{m=1}^{N_{CFI,c}} N_m + n_{CCE,l} + N_{PUCCH}^{(2)} \quad (4\text{-}0)$$

Where c is selected from $\{0, 1, 2, 3\}$ such that $N_c \le n_{CCE,j} < N_{c+1}$, $N \le n_{CCE,l} < N_{c+1}$, $N_c = \max\{0, \lfloor [N_{RB}^{DL} \cdot (N_{sc}^{RB} \cdot c - 4)]/36 \rfloor\}$, $N_{CFI,c}$ is detected Control Formal Indicator (CFI) value carried on Physical Control Format Indicator Channel (PCFICH) channel in subframe c, $n_{CCE,j}$ and $n_{CCE,l}$ is the number of the first CCE used for transmission of the corresponding PDCCH in subframe j and l respectively. Index j is the index of Type 1 subframe within set $K_1$ and index 1 is the index of Type 2 subframe within set $K_2$.

$N_{PUCCH}^{(1)}$ is PUCCH resource offset associated with legacy PDCCH that is configured by higher layers for PUCCH resource mapping. $N_{PUCCH}^{(2)}$ is a PUCCH resource offset providing the starting point of the PUCCH resources for Type 2 subframes, which can be configured by higher layer, either in a UE specific or Cell specific manner, or be calculated using the formula:

$$N_{PUCCH}^{(2)} = M_1 \cdot N_4 \quad (5\text{-}0)$$

This PUCCH Format 1a/1b resource for an HARQ-ACK signal transmission in response to legacy PDCCH-scheduled PDSCH can be further optimized by introducing 2-bits ARO (i.e. HARQ-ACK resource offset field) to avoid excessive control overhead, and considering the fact that dynamic PUCCH format 1a/1b resource space is often underutilized. If UL/DL reconfiguration has been activated for one UE, an explicit 2-bit ARO indication field is always present for all the DL DCI formats that are carried by UE specific search space on legacy PDCCH across all DL subframes, regardless of subframe type. The equation (1-0), (2-0), (3-0) and (4-0) can be straightforwardly extended to (1-1), (2-1), (3-1) and (4-1) by using 2-bits ARO as:

$$n_{PUCCH,j}^{(1)} = (M_1-j-1)\cdot N_c + j\cdot N_{c+1} + n_{CCE,j} + N_{PUCCH}^{(1)} + \Delta_{ARO} \quad (1\text{-}1)$$

$$n_{PUCCH,l}^{(1)} = (M_2-l-1)\cdot N_c + l\cdot N_{c+1} + n_{CCE,l} + N_{PUCCH}^{(2)} + \Delta_{ARO} \quad (2\text{-}1)$$

$$n_{PUCCH,l}^{(1)} = l\cdot N_4 + n_{CCE,l} + N_{PUCCH}^{(2)} + \Delta_{ARO} \quad (3\text{-}1)$$

$$n_{PUCCH,l}^{(1)} = \sum_{c=0}^{l-1}\sum_{m=1}^{N_{CFI,c}} N_m + n_{CCE,l} + N_{PUCCH}^{(2)} + \Delta_{ARO} \quad (4\text{-}1)$$

$\Delta_{ARO}$ is determined based on the value of M as follows: If M=1, $\Delta_{ARO}$ is determined from the HARQ-ACK resource offset field in the DCI format of the corresponding EPDCCH as given in Table 10.1.2.1-1. If M>1, $\Delta_{ARO}$ is determined from the HARQ-ACK resource offset field in the DCI format of the corresponding EPDCCH as given in Table 1 at 600 in FIG. 6.

UE shall assume the $\Delta_{ARO}=0$ for PUCCH resource mapping using equation (1-1) and (2-1) if the corresponding DCI is transmitted on Common Search Space (CSS) on legacy PDCCH in Type 1 subframe at least.

Figure 7:
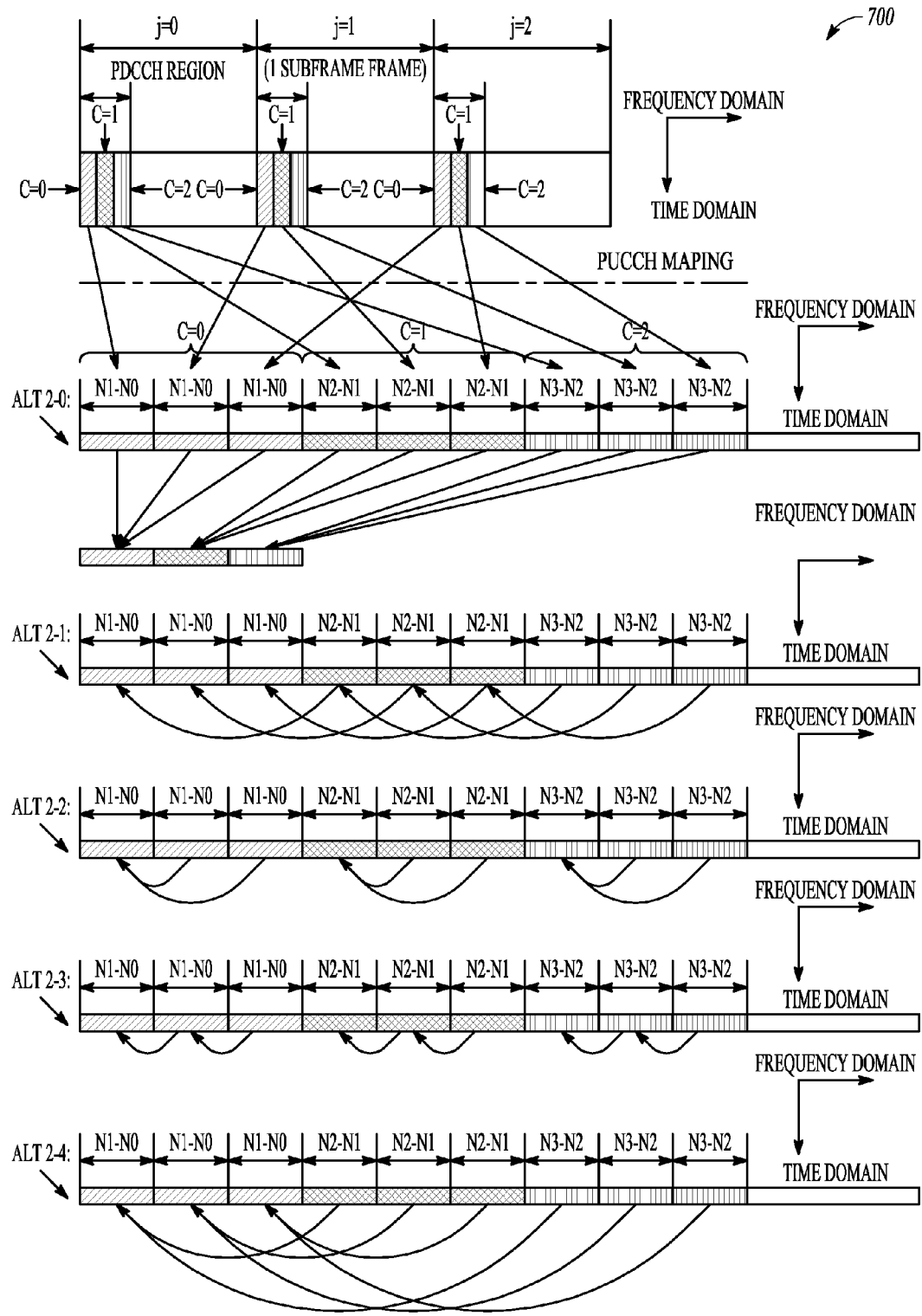
FIG. 7 is a timing diagram illustrating PUCCH mapping according to an example embodiment.

Several solutions could be considered for the definition of $\Delta_1$ or $\Delta_2$:

For Type 1 subframes: Alternative. 1: 0—same as M=1 case. Alternative 2:

Alt 2-0: $-(M_1-j-1)\cdot N_c-j\cdot N_{c+1}$
Alt 2-1: $-M_1\cdot(N_c-N_{c-1})$
Alt 2-2: $-j\cdot(N_{c+1}-N_c)$
Alt 2-3: $-(N_{c+1}-N_c)$
Alt 2-4: $-M_1\cdot N_c$ One example for Alternative 2 is shown at 700 in FIG. 7 by assuming that the $M_1=3$. As clearly shown in the Figure, the PUCCH overhead for type 1 subframes may be flexibly reduced by proper selecting ARO setting at eNB side.

For Type 2 subframes, all the potential values for $\Delta_1$ and $\Delta_2$ can be reused by replacing symbol j with symbol l and symbol $M_1$ with $M_2$. Additionally, some extra values may be used in further embodiments:

Alternative 0: $-(N^{(2)}_{PUCCH} - N^{(1)}_{PUCCH})$

Alternative 1: $M_1 \cdot N_4$

Alternative 2: $\sum_{c=0}^{M_1-1}\sum_{m=1}^{N_{CFI,c}} N_m$

Alternatives 1 and 2 are useful for the case that $N_{PUCCH}^{(1)}=N_{PUCCH}^{(2)}$ to ensure PUCCH always available and no eNB scheduler constrains incurs. For a PDSCH transmission where there is not a corresponding PDCCH/EPDCCH detected in subframe $n-k_i$, the value of the value of $n_{PUCCH,i}^{(1)}$ is determined according to higher layer configuration and Table 9.2-2 shown at 800 in FIG. 8.

For a PDSCH transmission indicated by the detection of corresponding EPDCCH or a EPDCCH indicating downlink SPS release in sub-frame $n-k_i$ where $k_i \in K$, the UE shall use if EPDCCH-PRB-set q is configured for distributed transmission:

$$n_{PUCCH,i}^{(1)} = n_{ECCE,q} + \sum_{i1=0}^{i-1} N_{ECCE,q,n-k_{i1}} + \Delta_{ARO} + N_{PUCCH,q}^{(e1)} \quad (5\text{-}0)$$

If EPDCCH-PRB-set q is configured for localised transmission $$n_{PUCCH,i}^{(1)} = \quad (6\text{-}0)$$
$$\left\lfloor \frac{n_{ECCE,q}}{N_{RB}^{ECCE,q}} \right\rfloor \cdot N_{RB}^{ECCE,q} + \sum_{i1=0}^{i-1} N_{ECCE,q,n-k_{i1}} + n' + \Delta_{ARO} + N_{PUCCH,q}^{(e1)}$$

where $n_{ECCE,q}$ is the number of the first ECCE (i.e. lowest ECCE index used to construct the EPDCCH) used for transmission of the corresponding DCI assignment in EPDCCH-PRB-set q in subframe $n-k_i$, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q in subframe $n-k_i$ is given in section 6.8A.1 in 3GPP TS 36.211 V. 11.2.0, n' is determined from the antenna port used for EPDCCH transmission in subframe n-k, which is described in section 6.8A.5 in 3GPP TS 36.211 V. 11.2.0. If i=0, $\Delta_{ARO}$ is determined from the HARQ-ACK resource offset field in the DCI format of the corresponding EPDCCH as given in Table 10.1.2.1-1. If i>0, $\Delta_{ARO}$ is determined from the HARQ-ACK resource offset field in the DCI format of the corresponding EPDCCH as given in Table 10.1.3.1-2, where the variable m in the table is substituted with i. If the UE is configured to monitor EPDCCH in subframe $n-k_{i1}$, $N_{ECCE,q,n-k_{i1}}$ is equal to the number of ECCEs in EPDCCH-PRB-set q configured for that UE in subframe $n-k_{i1}$. If the UE is not configured to monitor EPDCCH in subframe $n-k_{i1}$, $N_{ECCE,q,n-k_{i1}}$ is equal to the number of ECCEs computed assuming EPDCCH-PRB-set q is configured for that UE in subframe $n-k_{i1}$. For normal downlink CP, if subframe $n-k_{i1}$ is a special subframe with special subframe configuration 0 or 5, $N_{ECCE,q,n-k_{i1}}$ is equal to 0. For extended downlink CP, if subframe $n-k_i$ is a special subframe with special subframe configuration 0 or 4 or 7, $N_{ECCE,q,n-k_{i1}}$ is equal to 0.

Considering the fact that in certain configurations, different DL subframes in the bundling window may have different numbers of ECCEs per PRB pair even for the same EPDCCH set k, such as special subframe, etc., and have different minimum aggregation level as well, to avoid the unnecessary PUCCH overhead, the equation (5-0) and (6-0) can be changed to (5-1) and (6-1) below:

$$n_{PUCCH,i}^{(1)} = \left\lfloor \frac{n_{ECCE,q}}{L_i} \right\rfloor + \sum_{i1=0}^{i-1}\left(\frac{N_{ECCE,q,n-k_{i1}}}{L_{i1}}\right) + \Delta_{ARO} + N_{PUCCH,q}^{(e1)} \quad (5\text{-}1)$$

$$n_{PUCCH,i}^{(1)} = \left\lfloor \frac{n_{ECCE,q}}{L_i \cdot N_{RB}^{ECCE,q}} \right\rfloor \cdot N_{RB}^{ECCE,q} + \quad (6\text{-}1)$$
$$\sum_{i1=0}^{i-1}\left(\frac{N_{ECCE,q,n-k_{i1}}}{L_{i1}}\right) + n' + \Delta_{ARO} + N_{PUCCH,q}^{(e1)}$$

Where $L_i$ denotes the minimum supportable aggregation level in subframe i.

In a further embodiment utilizing a second solution, solution 2, the PUCCH format 3 is used for HARQ-ACK feedback. On the other hand, a different potential solution is that one (e.g. for one antenna port case) or two (e.g. for two antenna ports case) PUCCH format 1a/1b resource(s) are configured by higher layer for UL/DL reconfiguration capable of UE, and PUCCH format 3 is required to be configured for HARQ-ACK transmission after UL/DL reconfiguration is activated for one UE.

For a single PDSCH transmission or downlink SPS release indicated by the detection of a corresponding PDCCH/EPDCCH in subframe n-k, where $k_m \in K$, and the DAI value in the PDCCH/EPDCCH is equal to '1', the UE shall use the PUCCH format 1a/1b and the higher-layer configured PUCCH format 1a/1b resource for HARQ-ACK feedback.

For a single PDSCH transmission where there is not a corresponding PDCCH/EPDCCH detected within subframe(s) n-k, where $k \in K$, and no PDCCH/EPDCCH indicating downlink SPS release within subframe(s) n-k, where $k \in K$, UE shall determine the PUCCH resources according to higher layer configuration and Table 9.2-2.

Otherwise, UE shall use PUCCH format 3 and PUCCH resource $n_{PUCCH}^{(3,\tilde{p})}$ where the value of $n_{PUCCH}^{(3,\tilde{p})}$ is determined according to higher layer configuration and Table 10.1.2.2.2-1 shown at 900 in FIG. 9. If DAI value greater than '1' is indicated in PDCCH, the TPC field in a PDCCH assignment with DAI value greater than '1' shall be used to determine the PUCCH resource value from one of the four PUCCH resource values configured by higher layers, with the mapping defined in Table 10.1.2.2.2-1.

If DAI value greater than '1' is indicated in EPDCCH, the HARQ-ACK resource offset field in the DCI format of the corresponding EPDCCH assignment with DAI value greater than '1' shall be used to determine the PUCCH resource value from one of the four PUCCH resource values configured by higher layers, with the mapping defined in Table 10.1.2.2.2-1.

FIG. 10 is a flowchart illustrating a method 1000 beginning with UE receiving a physical downlink shared channel (PDSCH) transmission at 1010 from a base station. Processing circuitry is used to classify downlink (DL) subframe types at 1020 for a set of DL subframes associated with a first uplink (UL) subframe for transmission of a hybrid automatic report request acknowledgment (HARQ-ACK). The processing circuitry further performs physical uplink control channel (PUCCH) resources mapping at 1030 based on the classified DL subframe Types for an acknowledgement transmission associated with PDSCH transmission reception.

Figure 11:
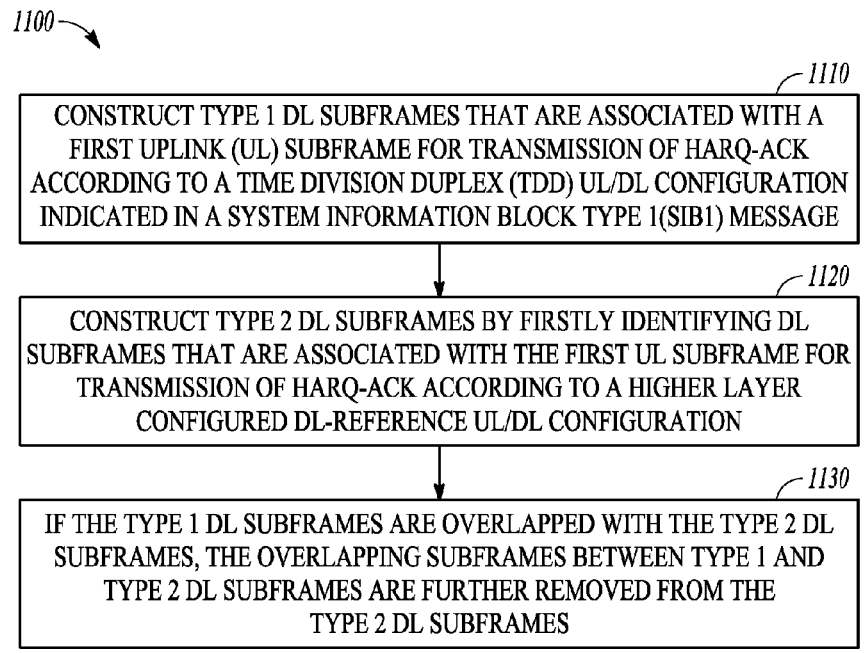
FIG. 11 is a flowchart illustrating a method of classifying DL subframe Types according to an example embodiment.

FIG. 11 is a flowchart illustrating a method 1100 of classifying the DL subframe Types. At 1110, Type 1 DL subframes that are constructed by DL subframes that are associated with a first uplink (UL) subframe for transmission of HARQ-ACK according to a time division duplex (TDD) UL/DL configuration indicated in a system information block Type 1 (SIB1) message. Type 2 DL subframes are constructed at 1120 by firstly identifying DL subframes that are associated with the first UL subframe for transmission of HARQ-ACK according to a higher layer configured DL-reference UL/DL configuration. If the Type 1 DL subframes are overlapped with the Type 2 DL subframes, the overlapping subframes between Type 1 and Type 2 DL subframes are further removed from the Type 2 DL subframes at 1130.

Figure 12:
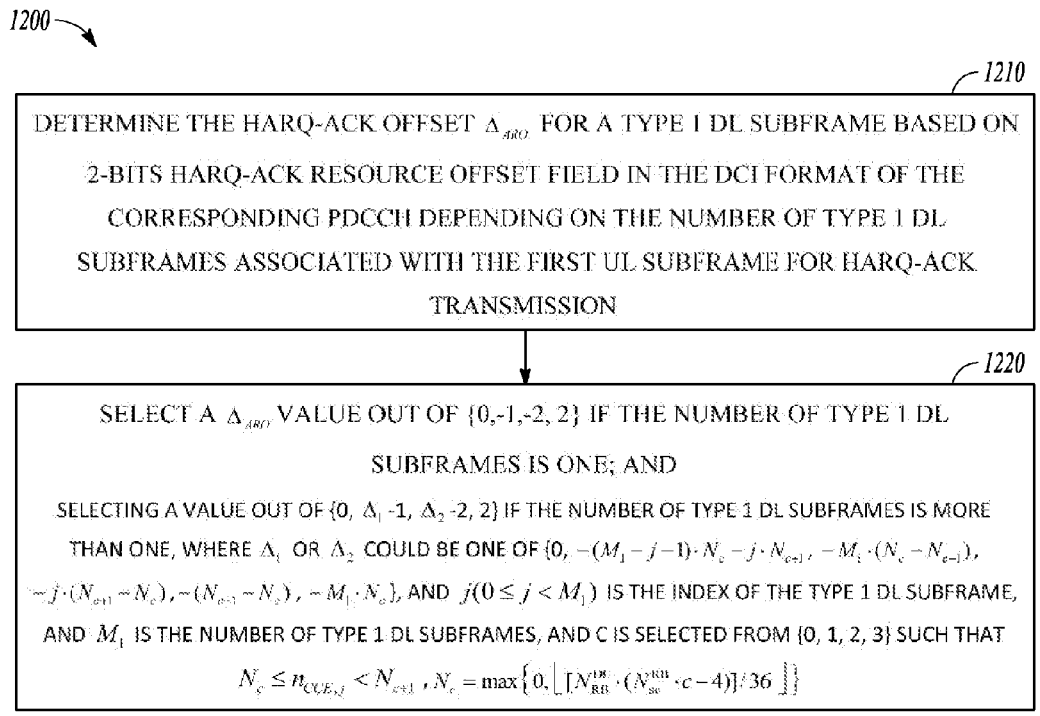
FIG. 12 is a flowchart illustrating a method of determining the offset for Type 1 DL subframes according to an example embodiment.

FIG. 12 is a flowchart illustrating a method 1200 of determining the offset for Type 1 DL subframes. At 1210, processing circuitry determines the HARQ-ACK offset $\Delta_{ARO}$ for a Type 1 DL subframe based on 2-bits HARQ-ACK resource offset field in the DCI format of the corresponding PDCCH depends on the number of Type 1 DL subframes associated with the first UL subframe for HARQ-ACK transmission. At 1220, processing circuitry begins by selecting a $\Delta_{ARO}$ value out of $\{0,-1,-2,2\}$ if the number of Type 1 DL subframes is one. At 1230, the processing circuitry selects a value out of $\{0, \Delta_1-1, \Delta_2-2, 2\}$ if the number of Type 1 DL subframes is more than one, where $\Delta_1$ or $\Delta_2$ could be one of $\{0, -(M_1-j-1)\cdot N_c-j\cdot N_{c+1}, -M_1\cdot(N_c-N_{c-1}), -j\cdot (N_{c+1}-N_c), -(N_{c+1}-N_c), -M_1\cdot N_c\}$, and $j(0 \le j \le M_1)$ is the index of the Type 1 DL subframe, and $M_1$ is the number of Type 1 DL subframes, and c is selected from $\{0, 1, 2, 3\}$ such that $N_c \le n_{CCE,j} < N_{c+1}, N_c = \max\{0, \lfloor [N_{RB}^{DL} \cdot (N_{sc}^{RB} \cdot c - 4)]/36 \rfloor\}$.

Figure 13:
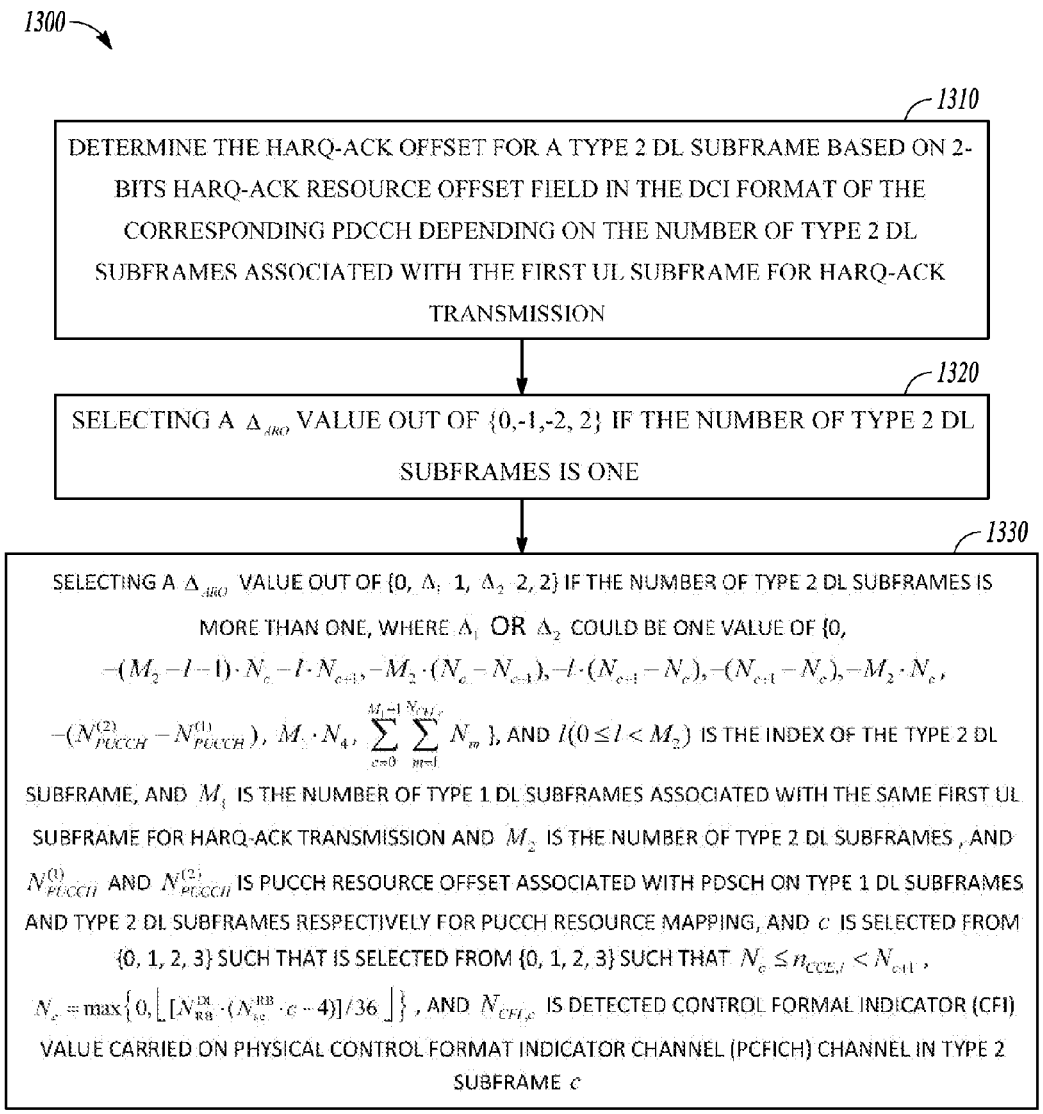
FIG. 13 is a flowchart illustrating a method of determining the offset for Type 2 DL subframe according to an example embodiment.

FIG. 13 is a flowchart illustrating a method 1300 of determining the offset for Type 2 DL subframe. At 1310 processing circuitry is used to determine the HARQ-ACK offset for a Type 2 DL subframe based on 2-bits HARQ-ACK resource offset field in the DCI format of the corresponding PDCCH depending on the number of Type 2 DL subframes associated with the first UL subframe for HARQ-ACK transmission. The method 1300 processed to select a $\Delta_{ARO}$ value out of $\{0,-1,-2,2\}$ at 1310 if the number of Type 2 DL subframes is one. At 1320, the processing circuitry selects a $\Delta_{ARO}$ value out of $\{0, \Delta_1-1, \Delta_2-2, 2\}$ if the number of Type 2 DL subframes is more than one, where $\Delta_1$ or $\Delta_2$ could be one value of $\{0, -(M_2-1-1)\cdot N_c-1\cdot N_{c+1}, -M_2\cdot(N_c-N_{c-1}), -1\cdot(N_{c+1}-N_c), -(N_{c+1}-N_c), -M_2\cdot N_c,$ $$-(N_{PUCCH}^{(2)} - N_{PUCCH}^{(1)}), M_1 \cdot N_4, \sum_{c=0}^{M_1-1} \sum_{m=1}^{N_{CFI,c}} N_m\},$$

and $l(0 \le l < M_2)$ is the index of the Type 2 DL subframe, and $M_1$ is the number of Type 1 DL subframes associated with the same first UL subframe for HARQ-ACK transmission and $M_2$ is the number of Type 2 DL subframes, and $NUC_{CH}$ and $N_{PUCCH}^{(2)}$ is PUCCH resource offset associated with PDSCH on Type 1 DL subframes and Type 2 DL subframes respectively for PUCCH resource mapping, and c is selected from $\{0, 1, 2, 3\}$ such that is selected from $\{0, 1, 2, 3\}$ such that $N_c < n_{CCE,i} < N_{c+1}$, $N_c = \max\{0, \lfloor [N_{RB}^{DL} \cdot (N_{sc}^{RB} \cdot c - 4)]/36 \rfloor\}$, and $N_{CFI,c}$ is detected Control Formal Indicator (CFI) value carried on Physical Control Format Indicator Channel (PCFICH) channel in Type 2 subframe c.

Figure 14:
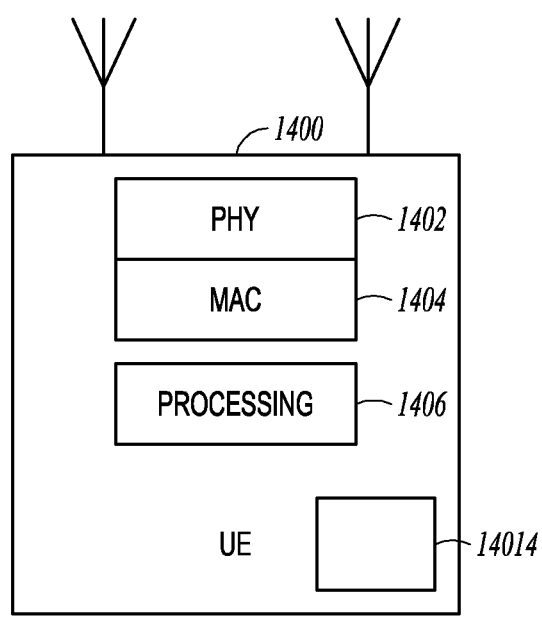
FIG. 14 is a block diagram of electronic circuitry for performing one or more methods according to example embodiments.

FIG. 14 is a block diagram of a specifically programmed computer system to act as one or more different types of UE, cell stations, including small cell stations and macro stations. The system may be used to implement one or more methods according to the examples described. In the embodiment shown in FIG. 14, a hardware and operating environment is provided to enable the computer system to execute one or more methods and functions that are described herein. In some embodiments, the system may be a small cell station, macro cell station, smart phone, tablet, or other networked device that can provide access and wireless networking capabilities to one or more devices. Such devices need not have all the components included in FIG. 14.

FIG. 14 illustrates a functional block diagram of a cell station 1400 in accordance with some embodiments. Cell station 1400 may be suitable for use as a small cell station, macro cell station, or user equipment, such as a wireless cell phone, tablet or other computer. The cell station 1400 may include physical layer circuitry 1402 for transmitting and receiving signals to and from eNBs using one or more antennas 1401. Cell station 1400 may also include processing circuitry 1404 that may include, among other things a channel estimator. Cell station 1400 may also include memory 1406. The processing circuitry may be configured to determine several different feedback values discussed below for transmission to the eNB. The processing circuitry may also include a media access control (MAC) layer.

In some embodiments, the cell station 1400 may include one or more of a keyboard, a display, a non-volatile memory port, multiple antennas, a graphics processor, an application processor, speakers, and other mobile device elements. The display may be an LCD screen including a touch screen.

The one or more antennas 1401 utilized by the cell station 1400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the cell station 1400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the cell station 1400 may be configured with the instructions to perform the operations described herein.

In some embodiments, the cell station 1400 may be configured to receive OFDM communication signals over a multicarrier communication channel in accordance with an OFDMA communication technique. The OFDM signals may comprise a plurality of orthogonal subcarriers. In some broadband multicarrier embodiments, evolved node Bs (eNBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the cell station 1400 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain and N consecutive symbols corresponding to 0.5 ms in the time domain depends on the cyclic prefix length configured by the higher layer parameter. In these embodiments, the PRB may comprise a plurality of resource elements (REs). A RE is uniquely defined by the index pair (k, 1) in a slot where k is index in frequency domain and 1 is the index in the time domain.

Two types of reference signals may be transmitted by an eNB including demodulation reference signals (DM-RS), a common reference signal (CRS) and/or channel state information reference signals (CSI-RS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the cell station 1400 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the cell station 1400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the cell station may be configured in one of 8 "transmission modes" for PDSCH reception: Mode 1: Single antenna port, port 0; Mode 2: Transmit diversity; Mode 3: Large-delay CDD; Mode 4: Closed-loop spatial multiplexing; Mode 5: MU-MIMO; Mode 6: Closed-loop spatial multiplexing, single layer; Mode 7: Single antenna port, cell station-specific RS (port 5); Mode 8 (new in Rel-9): Single or dual-layer transmission with cell station-specific RS (ports 7 and/or 8). The CSI-RS are used by the cell station for channel estimates (i.e., CQI measurements). In some embodiments, the CSI-RS are transmitted periodically in particular antenna ports (up to eight transmit antenna ports) at different subcarrier frequencies (assigned to the cell station) for use in estimating a MIMO channel. In some embodiments, a cell station-specific demodulation reference signal (e.g., a DM-RS) may be precoded in the same way as the data when non-codebook-based precoding is applied.

EXAMPLES

1. A device comprising:
   a transceiver to receive, from a base station, a physical downlink shared channel (PDSCH) transmission; and
   processing circuitry to:
      classify downlink (DL) subframe types for a set of DL subframes associated with a first uplink (UL) subframe for transmission of a hybrid automatic report request acknowledgment (HARQ-ACK); and
      perform physical uplink control channel (PUCCH) resources mapping based on the classified DL subframe Types for an acknowledgement transmission associated with PDSCH transmission reception.

2. The device of example 1 wherein the DL subframe types comprise:
   Type 1 DL subframes that are constructed by DL subframes that are associated with a first uplink (UL) subframe for transmission of HARQ-ACK according to a time division duplex (TDD) UL/DL configuration indicated in a system information block Type 1(SIB1) message; and Type 2 DL subframes that are constructed by:
firstly identifying DL subframes that are associated with the first UL subframe for transmission of HARQ-ACK according to a higher layer configured DL-reference UL/DL configuration; and
if the Type 1 DL subframes are overlapped with the Type 2 DL subframes, the overlapping subframes between Type 1 and Type 2 DL subframes are further removed from the Type 2 DL subframes.

3. The device of any of examples 1-2, wherein the processing circuitry further performs PUCCH resource mapping for PDSCH transmission indicated via Physical Downlink Control Channel (PDCCH) on a Type 1 DL subframe based on:

$$n_{PUCCH,j}^{(1)} = (M_1 - j - 1) \cdot N_c + j \cdot N_{c+1} + n_{CCE,j} + N_{PUCCH}^{(1)}$$

where $N_{PUCCH}^{(1)}$ is a PUCCH resource offset associated with legacy PDCCH that is configured by higher layer for PUCCH resource mapping of Type 1 DL subframes, c is selected from $\{0, 1, 2, 3\}$ such that $N_c \leq n_{CCE,j} < N_{c+1}$, $N_c = \max\{0, \lfloor [N_{RB}^{DL} \cdot (N_{sc}^{RB} \cdot c - 4)]/36 \rfloor\}$, $N_{RB}^{DL}$ refers to Downlink bandwidth configuration and $N_{sc}^{RB}$ refers to resource block size in the frequency domain that is expressed as a number of subcarriers, $n_{CCE,j}$ is the number of the first control channel element (CCE) used for transmission of the corresponding PDCCH in Type 1 DL subframe j, and $j(0 \leq j \leq M_1)$ is the index of the Type 1 DL subframe, and $M_1$ is the number of Type 1 DL subframes.

4. The device of example 3, wherein the processing circuitry further performs PUCCH resource mapping for PDSCH transmission indicated via PDCCH on a Type 1 DL subframe based on:

$$n_{PUCCH,j}^{(1)} = (M_1 - j - 1) \cdot N_c + j \cdot N_{c+1} + n_{CCE,j} + N_{PUCCH}^{(1)} + \Delta_{ARO}$$

Where $j(0 \leq j \leq M_1)$ is the index of the Type 1 DL subframe, and $\Delta_{ARO}$ refers to HARQ-ACK resource offset value that is selected from predefined values based on 2-bits HARQ-ACK resource offset field in a downlink control information (DCI) format depending on the number of Type 1 DL subframes associated with the first UL subframe for HARQ-ACK transmission.

5. The device of example 4, wherein the processing circuitry further performs determining the HARQ-ACK offset $\Delta_{ARO}$ for a Type 1 DL subframe based on 2-bits HARQ-ACK resource offset field in the DCI format of the corresponding PDCCH depending on the number of Type 1 DL subframes associated with the first UL subframe for HARQ-ACK transmission:

selecting a $\Delta_{ARO}$ value out of $\{0,-1,-2, 2\}$ if the number of Type 1 DL subframes is one; and selecting a value out of $\{0, \Delta_1-1, \Delta_2-2, 2\}$ if the number of Type 1 DL subframes is more than one, where $\Delta_1$ or $\Delta_2$ could be one of $\{0, -(M_1-j-1) \cdot N_c - j \cdot N_{c+1}, -M_1 \cdot (N_c - N_{c-1}), -j \cdot (N_{c+1} - N_c), -(N_{c+1} - N_c), -M_1 \cdot N_c\}$, and $j(0 \leq j \leq M_1)$ is the index of the Type 1 DL subframe, and $M_1$ is the number of Type 1 DL subframes, and c is selected from $\{0, 1, 2, 3\}$ such that $N_c \leq n_{CCE,j} < N_{c+1}$, $N_c = \max\{0, \lfloor [N_{RB}^{DL} \cdot (N_{sc}^{RB} \cdot c - 4)]/36 \rfloor\}$.

6. The device of any of examples 1-5, wherein the processing circuitry further performs PUCCH resource mapping for PDSCH transmission indicated via Physical Downlink Control Channel (PDCCH) on a Type 2 DL subframe based on higher-layer signaling or based on:

$$n_{PUCCH,l}^{(1)} = (M_2 - l - 1) \cdot N_c + l \cdot N_{c+1} + n_{CCE,l} + N_{PUCCH}^{(2)}$$

or $$n_{PUCCH,l}^{(1)} = l \cdot N_4 + n_{CCE,l} + N_{PUCCH}^{(2)}$$

or $$n_{PUCCH,l}^{(1)} = \sum_{c=0}^{l-1} \sum_{m=1}^{N_{CFI,c}} N_m + n_{CCE,l} + N_{PUCCH}^{(2)}$$

where $N_{PUCCH}^{(2)}$ is PUCCH resource offset associated with PDSCH on Type 2 DL subframes for PUCCH resource mapping, and c is selected from $\{0, 1, 2, 3\}$ such that $N_c \leq n_{CCE,l} < N_{c+1}$, $N_c = \max\{0, \lfloor [N_{RB}^{DL} \cdot (N_{sc}^{RB} \cdot c - 4)]/36 \rfloor\}$, $N_{RB}^{DL}$ refers to downlink bandwidth configuration and $N_{sc}^{RB}$ refers to resource block size in the frequency domain that is expressed as a number of subcarriers. $n_{CCE,l}$ is the number of the first channel control element (CCE) used for transmission of the corresponding PDCCH in Type 2 DL subframe l, and $l(0 \leq l < M_2)$ is the index of a Type 2 DL subframe and $M_2$ is the number of Type 2 DL subframes, and $N_{CFI,c}$ is detected Control Formal Indicator (CFI) value carried on Physical Control Format Indicator Channel (PCFICH) channel in Type 2 subframe c.

7. The device of example 6 wherein the PUCCH resource offset $N_{PUCCH}^{(2)}$ are configured by higher layer signal in a user equipment specific manner or a Cell-specific manner, or determined based on:

$$N_{PUCCH}^{(2)} = M_1 \cdot N_4$$

where $M_1$ is a number of Type 1 DL subframes associated with the first UL subframe for HARQ-ACK transmission, and $N_4$ refers to PUCCH resources reserved for a Type 1 DL subframe and is calculated according to $N_c = \max\{0, \lfloor [N_{RB}^{DL} \cdot (N_{sc}^{RB} \cdot c - 4)]/36 \rfloor\}$.

8. The device of example 6, wherein the processing circuitry further performs PUCCH resource mapping for PDSCH transmission on a Type 2 DL subframe via PDCCH based on:

$$n_{PUCCH,l}^{(1)} = (M_2 - l - 1) \cdot N_c + l \cdot N_{c+1} + n_{CCE,l} + N_{PUCCH}^{(2)} + \Delta_{ARO}$$

or $$n_{PUCCH,l}^{(1)} = l \cdot N_4 + n_{CCE,l} + N_{PUCCH}^{(2)} + \Delta_{ARO}$$

or $$n_{PUCCH,l}^{(1)} = \sum_{c=0}^{l-1} \sum_{m=1}^{N_{CFI,c}} N_m + n_{CCE,l} + N_{PUCCH}^{(2)} + \Delta_{ARO}$$

where $l(0 \leq l < M_2)$ is the index of the Type 2 DL subframe, and $\Delta_{ARO}$ refers to HARQ-ACK resource offset value that is selected based on 2-bits HARQ-ACK resource offset field in a downlink control information (DCI) format depending on the number of Type 2 DL subframes associated with the first UL subframe for HARQ-ACK transmission.

9. The device of example 8, wherein the processing circuitry further performs determining the HARQ-ACK offset for a Type 2 DL subframe based on 2-bits HARQ-ACK resource offset field in the DCI format of the corresponding PDCCH depending on the number of Type 2 DL subframes associated with the first UL subframe for HARQ-ACK transmission:

selecting a $\Delta_{ARO}$ value out of $\{0,-1,-2, 2\}$ if the number of Type 2 DL subframes is one.

selecting a $\Delta_{ARO}$ value out of $\{0, \Delta_1-1, \Delta_2-2, 2\}$ if the number of Type 2 DL subframes is more than one, where $\Delta_1$ or $\Delta_2$ could be one value of $\{0, -(M_2-1-1) \cdot N_c -1 \cdot N_{c+1}, -M_2 \cdot (N_c-N_{c-1}), -1 \cdot (N_{c+1}-N_c), -(N_{c+1}-N_c), -M_2 \cdot N_c,$ $$-(N_{PUCCH}^{(2)} - N_{PUCCH}^{(1)}), M_1 \cdot N_4, \sum_{c=0}^{M_1-1} \sum_{m=1}^{N_{CFI,c}} N_m\},$$

and $l (0 \leq l < M_2)$ is the index of the Type 2 DL subframe, and $M_1$ is the number of Type 1 DL subframes associated with the same first UL subframe for HARQ-ACK transmission and $M_2$ is the number of Type 2 DL subframes, and $N_{PUCCH}^{(1)}$ and $N_{PUCCH}^{(2)}$ is PUCCH resource offset associated with PDSCH on Type 1 DL subframes and Type 2 DL subframes respectively for PUCCH resource mapping, and c is selected from $\{0, 1, 2, 3\}$ such that is selected from $\{0, 1, 2, 3\}$ such that $N_c \leq n_{CCE,i} < N_{c+1}$, $N_c = \max\{0, \lfloor [N_{RB}^{DL} \cdot (N_{sc}^{RB} \cdot c-4)]/36 \rfloor\}$, and $N_{CFI,c}$ is detected Control Formal Indicator (CFI) value carried on Physical Control Format Indicator Channel (PCFICH) channel in Type 2 subframe c.

10. The device of any of examples 1-9, wherein the processing circuitry further performs PUCCH resource mapping for PDSCH transmission indicated via enhanced physical downlink control channel (EPDCCH) or a EPDCCH indicating downlink semi persistent scheduling (SPS) release in a Type 1 or Type 2 sub-frame, the user equipment (UE) shall use:

$$n_{PUCCH,i}^{(1)} = n_{ECCE,q} + \sum_{i1=0}^{i-1} N_{ECCE,q,n-k_{i1}} + \Delta_{ARO} + N_{PUCCH,q}^{(e1)}$$

if EPDCCH-physical resource block(PRB)-set q is configured for distributed transmission, or $$n_{PUCCH,i}^{(1)} = \left\lfloor \frac{n_{ECCE,q}}{N_{RB}^{ECCE,q}} \right\rfloor \cdot N_{RB}^{ECCE,q} + \sum_{i1=0}^{i-1} N_{ECCE,q,n-k_{i1}} + n' + \Delta_{ARO} + N_{PUCCH,q}^{(e1)}$$

if EPDCCH-PRB-set q is configured for localised transmission where $n_{ECCE,q}$ is the number of the first ECCE (i.e. lowest ECCE index used to construct the EPDCCH) used for transmission of a corresponding downlink control information (DCI) assignment in EPDCCH-PRB-set q in subframe $n-k_i$, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q in subframe $n-k_i$ is given, and n' is determined from the antenna port used for EPDCCH transmission in subframe $n-k_i$, and $\Delta_{ARO}$ is the HARQ-ACK resource offset.

11. The device of example 10, wherein the processing circuitry further performs PUCCH resource mapping for PDSCH transmission indicated via EPDCCH or EPDCCH indicating downlink SPS release in a Type 1 or Type 2 sub-frame, the user equipment (UE) shall use:

$$n_{PUCCH,i}^{(1)} = \left\lfloor \frac{n_{ECCE,q}}{L_i} \right\rfloor + \sum_{i1=0}^{i-1} \left( \frac{N_{ECCE,q,n-k_{i1}}}{L_{i1}} \right) + \Delta_{ARO} + N_{PUCCH,q}^{(e1)}$$

or $$n_{PUCCH,i}^{(1)} = \left\lfloor \frac{n_{ECCE,q}}{L_i \cdot N_{RB}^{ECCE,q}} \right\rfloor \cdot N_{RB}^{ECCE,q} + \sum_{i1=0}^{i-1} \left( \frac{N_{ECCE,q,n-k_{i1}}}{L_{i1}} \right) + n' + \Delta_{ARO} + N_{PUCCH,q}^{(e1)}$$

where $L_i$ denotes the minimum supportable aggregation level in subframe i.

12. A method comprising:
receiving from a base station via a transceiver, a physical downlink shared channel (PDSCH) transmission;
classifying, via processing circuitry, downlink (DL) subframe types for a set of DL subframes associated with a first uplink (UL) subframe for transmission of a hybrid automatic report request acknowledgment (HARQ-ACK); and
performing physical uplink control channel (PUCCH) resources mapping based on the classified DL subframe Types for an acknowledgement transmission associated with PDSCH transmission reception.

13. The method of example 12 wherein the DL subframe types comprise:
Type 1 DL subframes that are constructed by DL subframes that are associated with a first uplink (UL) subframe for transmission of HARQ-ACK according to a time division duplex (TDD) UL/DL configuration indicated in a system information block Type 1 (SIB1) message; and
Type 2 DL subframes that are constructed by:
firstly identifying DL subframes that are associated with the first UL subframe for transmission of HARQ-ACK according to a higher layer configured DL-reference UL/DL configuration; and
if the Type 1 DL subframes are overlapped with the Type 2 DL subframes, the overlapping subframes between Type 1 and Type 2 DL subframes are further removed from the Type 2 DL subframes.

14. The method of any of examples 12-13, further comprising performing PUCCH resource mapping for PDSCH transmission indicated via Physical Downlink Control Channel (PDCCH) on a Type 1 DL subframe based on:

$$n_{PUCCH,j}^{(1)} = (M_1-j-1) \cdot N_c + j \cdot N_{c+1} + n_{CCE,j} + N_{PUCCH}^{(1)}$$

where $N_{PUCCH}^{(1)}$ is a PUCCH resource offset associated with legacy PDCCH that is configured by higher layer for PUCCH resource mapping of Type 1 DL subframes, c is selected from $\{0, 1, 2, 3\}$ such that $N_c \leq n_{CCE,j} < N_{c+1}$, $N_c = \max\{0, \lfloor [N_{RB}^{DL} \cdot (N_{sc}^{RB} \cdot c-4)]/36 \rfloor\}$, $N_{RB}^{DL}$ refers to downlink bandwidth configuration and $N_{sc}^{RB}$ refers to resource block size in the frequency domain that is expressed as a number of subcarriers, $n_{CCE,j}$ is the number of the first control channel element (CCE) used for transmission of the corresponding PDCCH in Type 1 DL subframe j, and $j (0 \leq j \leq M_1)$ is the index of the Type 1 DL subframe, and $M_1$ is the number of Type 1 DL subframes.

15. The method of example 14, further comprising performing PUCCH resource mapping for PDSCH transmission indicated via PDCCH on a Type 1 DL subframe based on:

$$n_{PUCCH,j}^{(1)} = (M_1-j-1) \cdot N_c + j \cdot N_{c+1} + n_{CCE,j} + N_{PUCCH}^{(1)} + \Delta_{ARO}$$

where $j (0 \leq j \leq M_1)$ is the index of the Type 1 DL subframe, and $\Delta_{ARO}$ refers to HARQ-ACK resource offset value that is selected from predefined values based on 2-bits HARQ-ACK resource offset field in a downlink control information (DCI) format depending on the number of Type 1 DL subframes associated with the first UL subframe for HARQ-ACK transmission.

16. The method of example 15, further comprising determining the HARQ-ACK offset $\Delta_{ARO}$ for a Type 1 DL subframe based on 2-bits HARQ-ACK resource offset field in the DCI format of the corresponding PDCCH depending on the number of Type 1 DL subframes associated with the first UL subframe for HARQ-ACK transmission:

selecting a $\Delta_{ARO}$ value out of $\{0,-1,-2, 2\}$ if the number of Type 1 DL subframes is one; and selecting a value out of $\{0, \Delta_1-1, \Delta_2-2, 2\}$ if the number of Type 1 DL subframes is more than one, where $\Delta_1$ or $\Delta_2$ could be one of $\{0, -(M_1-j-1)\cdot N_c-j\cdot N_{c+1}, -M_1\cdot(N_c-N_{c-1}), -j\cdot(N_{c+1}-N_c),-(N_{c+1}-N_c), -M_1\cdot N_c\}$, and $j(0 \le j \le M_1)$ is the index of the Type 1 DL subframe, and $M_1$ is the number of Type 1 DL subframes, and c is selected from $\{0, 1, 2, 3\}$ such that $N_c \le n_{CCE,j}<N_{c+1}, N_c=\max\{0,\lfloor[N_{RB}^{DL}\cdot(N_{sc}^{RB}\cdot c-4)]/36\rfloor\}$.

17. The method of any of examples 12-16, further comprising performing PUCCH resource mapping for PDSCH transmission indicated via Physical Downlink Control Channel (PDCCH) on a Type 2 DL subframe based on higher-layer signaling or based on:

$$n_{PUCCH,l}^{(1)} = (M_2 - l - 1)\cdot N_c + l\cdot N_{c+1} + n_{CCE,l} + N_{PUCCH}^{(2)}$$

or $$n_{PUCCH,l}^{(1)} = l\cdot N_4 + n_{CCE,l} + N_{PUCCH}^{(2)}$$

or $$n_{PUCCH,l}^{(1)} = \sum_{c=0}^{l-1}\sum_{m=1}^{N_{CFI,c}} N_m + n_{CCE,l} + N_{PUCCH}^{(2)}$$

where $N_{PUCCH}^{(2)}$ is PUCCH resource offset associated with PDSCH on Type 2 DL subframes for PUCCH resource mapping, and c is selected from $\{0, 1, 2, 3\}$ such that $N_c \le n_{CCE,l}<N_{c+1}$, $N_c=\max\{0,\lfloor[N_{RB}^{DL}\cdot(N_{sc}^{RB}\cdot c-4)]/36\rfloor\}$, $N_{RB}^{DL}$ refers to downlink bandwidth configuration and $N_{sc}^{RB}$ refers to resource block size in the frequency domain that is expressed as a number of subcarriers. $n_{CCE,l}$ is the number of the first channel control element (CCE) used for transmission of the corresponding PDCCH in Type 2 DL subframe l, and $l(0 \le l < M_2)$ is the index of a Type 2 DL subframe and $M_2$ is the number of Type 2 DL subframes, and $N_{CFI,c}$ is detected Control Formal Indicator (CFI) value carried on Physical Control Format Indicator Channel (PCFICH) channel in Type 2 subframe c.

18. The method of example 17 wherein the PUCCH resource offset $N_{PUCCH}^{(2)}$ are configured by higher layer signal in a user equipment specific manner or a Cell-specific manner, or determined based on:

$$N_{PUCCH}^{(2)}=M_1\cdot N_4$$

where $M_1$ is a number of Type 1 DL subframes associated with the first UL subframe for HARQ-ACK transmission, and $N_4$ refers to PUCCH resources reserved for a Type 1 DL subframe and is calculated according to $N_c=\max\{0,\lfloor[N_{RB}^{DL}\cdot(N_{sc}^{RB}\cdot c-4)]/36\rfloor\}$.

19. The method of example 17, further comprising performing PUCCH resource mapping for PDSCH transmission on a Type 2 DL subframe via PDCCH based on:

$$n_{PUCCH,l}^{(1)} = (M_2 - l - 1)\cdot N_c + l\cdot N_{c+1} + n_{CCE,l} + N_{PUCCH}^{(2)} + \Delta_{ARO}$$

or $$n_{PUCCH,l}^{(1)} = l\cdot N_4 + n_{CCE,l} + N_{PUCCH}^{(2)} + \Delta_{ARO}$$

or $$n_{PUCCH,l}^{(1)} = \sum_{c=0}^{l-1}\sum_{m=1}^{N_{CFI,c}} N_m + n_{CCE,l} + N_{PUCCH}^{(2)} + \Delta_{ARO}$$

where $l(0 \le l < M_2)$ is the index of the Type 2 DL subframe, and $\Delta_{ARO}$ refers to HARQ-ACK resource offset value that is selected based on 2-bits HARQ-ACK resource offset field in a downlink control information (DCI) format depending on the number of Type 2 DL subframes associated with the first UL subframe for HARQ-ACK transmission.

20. The method of example 19, further comprising determining the HARQ-ACK offset for a Type 2 DL subframe based on 2-bits HARQ-ACK resource offset field in the DCI format of the corresponding PDCCH depending on the number of Type 2 DL subframes associated with the first UL subframe for HARQ-ACK transmission:

selecting a $\Delta_{ARO}$ value out of $\{0,-1,-2, 2\}$ if the number of Type 2 DL subframes is one.

selecting a $\Delta_{ARO}$ value out of $\{0, \Delta_1-1, \Delta_2-2, 2\}$ if the number of Type 2 DL subframes is more than one, where $\Delta_1$ or $\Delta_2$ could be one value of $\{0, -(M_2-l-1)\cdot N_c-l\cdot N_{c+1},-M_2\cdot(N_c-N_{c-1}),-l\cdot(N_{c+1}-N_c),-(N_{c+1}-N_c),-M_2\cdot N_c,$ $$-(N_{PUCCH}^{(2)} - N_{PUCCH}^{(1)}), M_1\cdot N_4, \sum_{c=0}^{M_1-1}\sum_{m=1}^{N_{CFI,c}} N_m\},$$

and $l(0 \le l < M_2)$ is the index of the Type 2 DL subframe, and $M_1$ is the number of Type 1 DL subframes associated with the same first UL subframe for HARQ-ACK transmission and $M_2$ is the number of Type 2 DL subframes, and $N_{PUCCH}^{(1)}$ and $N_{PUCCH}^{(2)}$ is PUCCH resource offset associated with PDSCH on Type 1 DL subframes and Type 2 DL subframes respectively for PUCCH resource mapping, and c is selected from $\{0, 1, 2, 3\}$ such that is selected from $\{0, 1, 2, 3\}$ such that $N_c \le n_{CCE,l}<N_{c+1}$, $N_c=\max\{0,\lfloor[N_{RB}^{DL}\cdot(N_{sc}^{RB}\cdot c-4)]/36\rfloor\}$, and $N_{CFI,c}$ is detected Control Formal Indicator (CFI) value carried on Physical Control Format Indicator Channel (PCFICH) channel in Type 2 subframe c.

21. The method of any of examples 12-20, further comprising performing PUCCH resource mapping for PDSCH transmission indicated via enhanced physical downlink control channel (EPDCCH) or a EPDCCH indicating downlink semi persistent scheduling (SPS) release in a Type 1 or Type 2 sub-frame, the user equipment (UE) shall use:

$$n_{PUCCH,i}^{(1)} = n_{ECCE,q} + \sum_{i1=0}^{i-1} N_{ECCE,q,n-k_{i1}} + \Delta_{ARO} + N_{PUCCH,q}^{(e1)}$$

if EPDCCH-physical resource block(PRB)-set q is configured for distributed transmission, or $$n_{PUCCH,i}^{(1)} = \left\lfloor\frac{n_{ECCE,q}}{N_{RB}^{ECCE,q}}\right\rfloor \cdot N_{RB}^{ECCE,q} + \sum_{i1=0}^{i-1} N_{ECCE,q,n-k_{i1}} + n' + \Delta_{ARO} + N_{PUCCH,q}^{(e1)}$$

if EPDCCH-PRB-set q is configured for localised transmission where $n_{ECCE,q}$ is the number of the first ECCE (i.e. lowest ECCE index used to construct the EPDCCH) used for transmission of a corresponding downlink control information (DCI) assignment in EPDCCH-PRB-set q in subframe n−$k_i$, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q in subframe n−$k_i$ is given, and n' is determined from the antenna port used for EPDCCH transmission in subframe n−$k_j$, and $\Delta_{ARO}$ is the HARQ-ACK resource offset.

22. The method of example 21, further comprising performing PUCCH resource mapping for PDSCH transmission indicated via EPDCCH or EPDCCH indicating downlink SPS release in a Type 1 or Type 2 sub-frame, the user equipment (UE) shall use:

$$n_{PUCCH,i}^{(1)} = \left\lfloor \frac{n_{ECCE,q}}{L_i} \right\rfloor + \sum_{i1=0}^{i-1}\left(\frac{N_{ECCE,q,n-k_{i1}}}{L_{i1}}\right) + \Delta_{ARO} + N_{PUCCH,q}^{(e1)}$$

or $$n_{PUCCH,i}^{(1)} = \left\lfloor \frac{n_{ECCE,q}}{L_i \cdot N_{RB}^{ECCE,q}} \right\rfloor \cdot N_{RB}^{ECCE,q} + \sum_{i1=0}^{i-1}\left(\frac{N_{ECCE,q,n-k_{i1}}}{L_{i1}}\right) + n' + \Delta_{ARO} + N_{PUCCH,q}^{(e1)}$$

where $L_i$ denotes the minimum supportable aggregation level in subframe i.

23. A machine readable storage device having instructions to cause a machine to:
receive from a base station via a transceiver, a physical downlink shared channel (PDSCH) transmission;
classify, via processing circuitry, downlink (DL) subframe types for a set of DL subframes associated with a first uplink (UL) subframe for transmission of a hybrid automatic report request acknowledgment (HARQ-ACK); and
perform physical uplink control channel (PUCCH) resources mapping based on the classified DL subframe Types for an acknowledgement transmission associated with PDSCH transmission reception.

24. The machine readable storage device of example 23 wherein the DL subframe types comprise:
Type 1 DL subframes that are constructed by DL subframes that are associated with a first uplink (UL) subframe for transmission of HARQ-ACK according to a time division duplex (TDD) UL/DL configuration indicated in a system information block Type 1(SIB1) message; and
Type 2 DL subframes that are constructed by:
firstly identifying DL subframes that are associated with the first UL subframe for transmission of HARQ-ACK according to a higher layer configured DL-reference UL/DL configuration; and
if the Type 1 DL subframes are overlapped with the Type 2 DL subframes, the overlapping subframes between Type 1 and Type 2 DL subframes are further removed from the Type 2 DL subframes.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
a transceiver to receive, from a base station, a physical downlink shared channel (PDSCH) transmission; and
processing circuitry to:
classify downlink (DL) subframe types for a set of DL subframes associated with a first uplink (UL) subframe for transmission of a hybrid automatic report request acknowledgment (HARQ-ACK), wherein the DL subframe types comprise at least Type 1 subframes that are constructed by DL subframes that are associated with the first uplink (UL) subframe for transmission of HARQ-ACK according to a time division duplex (TDD) UL/DL configuration indicated in a system information block Type 1(SIB1) message; and
perform physical uplink control channel (PUCCH) resources mapping based on the classified DL subframe Types for an acknowledgement transmission associated with PDSCH transmission reception
wherein the DL subframe types further comprise:
Type 2 DL subframes that are constructed by:
firstly identifying DL subframes that are associated with the first UL subframe for transmission of HARQ-ACK according to a higher layer configured DL-reference UL/DL configuration; and
when the Type 1 DL subframes are overlapped with the Type 2 DL subframes, the overlapping subframes between Type 1 and Type 2 DL subframes are further removed from the Type 2 DL subframes.

2. The device of claim 1, wherein the processing circuitry further performs PUCCH resource mapping for PDSCH transmission indicated via Physical Downlink Control Channel (PDCCH) on a Type 1 DL subframe based on:

$$n_{PUCCH,j}^{(1)} = (M_1 - j - 1) \cdot N_c + j \cdot N_{c+1} + n_{CCE,j} + N_{PUCCH}^{(1)}$$

where $N_{PUCCH}^{(1)}$ is a PUCCH resource offset associated with legacy PDCCH that is configured by higher layer for PUCCH resource mapping of Type 1 DL subframes, c is selected from {0, 1, 2, 3} such that $N_c \leq n_{CCE,j} < N_{c+1}$, $N_c = \max\{0, \lfloor [N_{RB}^{DL} \cdot (N_{sc}^{RB} \cdot c - 4)]/36 \rfloor\}$, $N_{RB}^{DL}$ refers to Downlink bandwidth configuration and $N_{sc}^{RB}$ refers to resource block size in the frequency domain that is expressed as a number of subcarriers, is a number of the first control channel element (CCE) used for transmission of the corresponding PDCCH in Type 1 DL subframe j, and j($0 \leq j < M_1$) is the index of the Type 1 DL subframe, and $M_1$ is a number of Type 1 DL subframes.

3. The device of claim 2, wherein the processing circuitry further performs PUCCH resource mapping for PDSCH transmission indicated via PDCCH on the Type 1 DL subframe based on:

$$n_{PUCCH,j}^{(1)} = (M_1 - j - 1) \cdot N_c + j \cdot N_{c+1} + n_{CCE,j} + N_{PUCCH}^{(1)} + \Delta_{ARO}$$

Where j($0 \leq j < M_1$) is the index of the Type 1 DL subframe, and $\Delta_{ARO}$ refers to HARQ-ACK resource offset value that is selected from predefined values based on 2-bits HARQ-ACK resource offset field in a downlink control information (DCI) format depending on the number of Type 1 DL subframes associated with the first UL subframe for HARQ-ACK transmission.

4. The device of claim 3, wherein the processing circuitry further performs determining the HARQ-ACK offset $\Delta_{ARO}$ for the Type 1 DL subframe based on 2-bits HARQ-ACK resource offset field in the DCI format of the corresponding PDCCH depending on the number of Type 1 DL subframes associated with the first UL subframe for HARQ-ACK transmission:
  selecting a $\Delta_{ARO}$ value out of $\{0,-1,-2, 2\}$ when the number of Type 1 DL subframes is one; and
  selecting a value out of $\{0, \Delta_1-1, \Delta_2-2, 2\}$ when the number of Type 1 DL subframes is more than one, where $\Delta_1$ or $\Delta_2$ could be one of $\{0, -(M_c-j-1)\cdot N_c-j\cdot N_{c+1}, -M_1\cdot(N_c-N_{c-1}), -j\cdot(N_{c+1}-N_c), -(N_{c+1}-N_c), -M_1\cdot N_c\}$, and $j(0\le j<M_1)$ is the index of the Type 1 DL subframe, and $M_1$ is the number of Type 1 DL subframes, and c is selected from $\{0, 1, 2, 3\}$ such that $N_c \le n_{CCE,j} < N_{c+1}$, $N_c = \max\{0, \lfloor [N_{RB}^{DL}\cdot(N_{sc}^{RB}\cdot c-4)]/36 \rfloor\}$.

5. The device of claim 1, wherein the processing circuitry further performs PUCCH resource mapping for PDSCH transmission indicated via Physical Downlink Control Channel (PDCCH) on a Type 2 DL subframe based on higher-layer signaling or based on:

$$n_{PUCCH,l}^{(1)} = (M_2 - l - 1)\cdot N_c + l\cdot N_{c+1} + n_{CCE,l} + N_{PUCCH}^{(2)}$$

or $$n_{PUCCH,l}^{(1)} = l\cdot N_4 + n_{CCE,l} + N_{PUCCH}^{(2)}$$

or $$n_{PUCCH,l}^{(1)} = \sum_{c=0}^{l-1}\sum_{m=1}^{N_{CFI,c}} N_m + n_{CCE,l} + N_{PUCCH}^{(2)}$$

where $N_{PUCCH}^{(2)}$ is PUCCH resource offset associated with PDSCH on Type 2 DL subframes for PUCCH resource mapping, and c is selected from $\{0, 1, 2, 3\}$ such that $N_c \le n_{CCE,l} < N_{c+1}$, $N_c = \max\{0, \lfloor [N_{RB}^{DL}\cdot(N_{sc}^{RB}\cdot c-4)]/36 \rfloor\}$, $N_{RB}^{DL}$ refers to downlink bandwidth configuration and $N_{sc}^{RB}$ refers to resource block size in the frequency domain that is expressed as a number of subcarriers. $n_{CCE,l}$ is a number of the first channel control element (CCE) used for transmission of the corresponding PDCCH in Type 2 DL subframe l, and $l(0\le l<M_2)$ is the index of a Type 2 DL subframe and $M_2$ is a number of Type 2 DL subframes, and $N_{CFI,c}$ is detected Control Formal Indicator (CFI) value carried on Physical Control Format Indicator Channel (PCFICH) channel in Type 2 subframe c.

6. The device of claim 5 wherein the PUCCH resource offset $N_{PUCCH}^{(2)}$ are configured by higher layer signal in the device specific manner or a Cell-specific manner, or determined based on:

$$N_{PUCCH}^{(2)} = M_1 \cdot N_4$$

where $M_1$ is a number of Type 1 DL subframes associated with the first UL subframe for HARQ-ACK transmission, and $N_4$ refers to PUCCH resources reserved for a Type 1 DL subframe and is calculated according to $N_c = \max\{0, \lfloor [N_{RB}^{DL}\cdot(N_{sc}^{RB}\cdot c-4)]/36 \rfloor\}$.

7. The device of claim 5, wherein the processing circuitry further performs PUCCH resource mapping for PDSCH transmission on the Type 2 DL subframe via PDCCH based on:

$$n_{PUCCH,l}^{(1)} = (M_2 - l - 1)\cdot N_c + l\cdot N_{c+1} + n_{CCE,l} + N_{PUCCH}^{(2)} + \Delta_{ARO}$$

or $$n_{PUCCH,l}^{(1)} = l\cdot N_4 + n_{CCE,l} + N_{PUCCH}^{(2)} + \Delta_{ARO}$$

or $$n_{PUCCH,l}^{(1)} = \sum_{c=0}^{l-1}\sum_{m=1}^{N_{CFI,c}} N_m + n_{CCE,l} + N_{PUCCH}^{(2)} + \Delta_{ARO}$$

where $l(0\le l<M_2)$ is the index of the Type 2 DL subframe, and $\Delta_{ARO}$ refers to HARQ-ACK resource offset value that is selected based on 2-bits HARQ-ACK resource offset field in a downlink control information (DCI) format depending on the number of Type 2 DL subframes associated with the first UL subframe for HARQ-ACK transmission.

8. The device of claim 7, wherein the processing circuitry further performs determining the HARQ-ACK offset for the Type 2 DL subframe based on 2-bits HARQ-ACK resource offset field in the DCI format of the corresponding PDCCH depending on the number of Type 2 DL subframes associated with the first UL subframe for HARQ-ACK transmission:
  selecting a $\Delta_{ARO}$ value out of $\{0,-1,-2, 2\}$ when the number of Type 2 DL subframes is one;
  selecting a $\Delta_{ARO}$ value out of $\{0, \Delta_1-1, \Delta_2-2, 2\}$ when the number of Type 2 DL subframes is more than one, where $\Delta_1$ or $\Delta_2$ could be one value of $\{0, -(M_2-l-1)\cdot N_c - l\cdot N_{c+1}, -M_2\cdot(N_c-N_{c-1}), -l\cdot(N_{c+1}-N_c), -(N_{c+1}-N_c), -M_2\cdot N_c,$ $$-(N_{PUCCH}^{(2)} - N_{PUCCH}^{(1)}), M_1\cdot N_4, \sum_{c=0}^{M_1-1}\sum_{m=1}^{N_{CFI,c}} N_m\},$$

and $l(0\le l<M_2)$ is the index of the Type 2 DL subframe, and $M_1$ is the number of Type 1 DL subframes associated with the same first UL subframe for HARQ-ACK transmission and $M_2$ is the number of Type 2 DL subframes, and $N_{PUCCH}^{(1)}$ and $N_{PUCCH}^{(2)}$ is PUCCH resource offset associated with PDSCH on Type 1 DL subframes and Type 2 DL subframes respectively for PUCCH resource mapping, and c is selected from $\{0, 1, 2, 3\}$ such that is selected from $\{0, 1, 2, 3\}$ such that $N_c \le n_{CCE,l} < N_{c+1}$, $N_c = \max\{0, \lfloor [N_{RB}^{DL}\cdot(N_{sc}^{RB}\cdot c-4)]/36 \rfloor\}$, and $N_{CFI,c}$ is detected Control Formal Indicator (CFI) value carried on Physical Control Format Indicator Channel (PCFICH) channel in Type 2 subframe c.

9. The device of claim 1, wherein the processing circuitry further performs PUCCH resource mapping for PDSCH transmission indicated via enhanced physical downlink control channel (EPDCCH) indicating downlink semi persistent scheduling (SPS) release in a Type 1 or Type 2 sub-frame, the device shall use:

$$n_{PUCCH,i}^{(1)} = n_{ECCE,q} + \sum_{i1=0}^{i-1} N_{ECCE,q,n-k_{i1}} + \Delta_{ARO} + N_{PUCCH,q}^{(e1)}$$

when EPDCCH-physical resource block(PRB)-set q is configured for distributed transmission, or $$n_{PUCCH,i}^{(1)} = \left\lfloor \frac{n_{ECCE,q}}{N_{RB}^{ECCE,q}} \right\rfloor \cdot N_{RB}^{ECCE,q} + \sum_{i1=0}^{i-1} N_{ECCE,q,n-k_{i1}} + n' + \Delta_{ARO} + N_{PUCCH,q}^{(e1)}$$

when EPDCCH-PRB-set q is configured for localised transmission where $n_{ECCE,q}$ is the number of the first ECCE used for transmission of a corresponding downlink control information (DCI) assignment in EPDCCH-PRB-set q in subframe $n-k_i$, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q in subframe $n+k_i$ is given, and n' is determined from the antenna port used for EPDCCH transmission in subframe $n-k_i$, and $\Delta_{ARO}$ is the HARQ-ACK resource offset.

10. The device of claim 9, wherein the processing circuitry further performs PUCCH resource mapping for PDSCH transmission indicated via EPDCCH indicating downlink SPS release in the Type 1 or Type 2 sub-frame, the device shall use:

$$n_{PUCCH,i}^{(1)} = \left\lfloor \frac{n_{ECCE,q}}{L_i} \right\rfloor + \sum_{i1=0}^{i-1}\left(\frac{N_{ECCE,q,n-k_{i1}}}{L_{i1}}\right) + \Delta_{ARO} + N_{PUCCH,q}^{(e1)}$$

or $$n_{PUCCH,i}^{(1)} = \left\lfloor \frac{n_{ECCE,q}}{L_i \cdot N_{RB}^{ECCE,q}} \right\rfloor \cdot N_{RB}^{ECCE,q} + \sum_{i1=0}^{i-1}\left(\frac{N_{ECCE,q,n-k_{i1}}}{L_{i1}}\right) + n' + \Delta_{ARO} + N_{PUCCH,q}^{(e1)}$$

where $L_i$ denotes the minimum supportable aggregation level in subframe i.

11. A method comprising:
receiving from a base station via a transceiver, a physical downlink shared channel (PDSCH) transmission;
classifying, via processing circuitry, downlink (DL) subframe types for a set of DL subframes associated with a first uplink (UL) subframe for transmission of a hybrid automatic report request acknowledgment (HARQ-ACK), wherein the DL subframe types comprise Type 1 subframes that are constructed by DL subframes that are associated with the first UL subframe for transmission of HARQ-ACK according to a time division duplex (TDD) UL/DL configuration indicated in a system information block Type 1(SIB1) message and wherein the DL subframe types further comprise Type 2 DL subframes that are constructed by identifying DL subframes that are associated with the first UL subframe for transmission of HARQ-ACK according to a higher layer configured DL-reference UL/DL configuration; and
performing physical uplink control channel (PUCCH) resources mapping based on the classified DL subframe Types for an acknowledgement transmission associated with PDSCH transmission reception;
wherein the Type 2 DL subframes are further constructed by:
determining that the Type 1 DL subframes are overlapped with the Type 2 DL subframes, and removing the overlapping subframes between Type 1 and Type 2 DL subframes from the Type 2 DL subframes.

12. The method of claim 11, further comprising performing PUCCH resource mapping for PDSCH transmission indicated via Physical Downlink Control Channel (PDCCH) on a Type 1 DL subframe based on:

$$n_{PUCCH,j}^{(1)} = (M_1-j-1) \cdot N_c + j \cdot N_{c+1} + n_{CCE,j} + N_{PUCCH}^{(1)}$$

where $N_{PUCCH}^{(1)}$ is a PUCCH resource offset associated with legacy PDCCH that is configured by higher layer for PUCCH resource mapping of Type 1 DL subframes, c is selected from $\{0, 1, 2, 3\}$ such that $N_c \leq n_{CCE,j} < N_{c+1}$, $N_c = \max\{0, \lfloor [N_{RB}^{DL} \cdot (N_{sc}^{RB} \cdot c-4)]/36 \rfloor\}$, $N_{RB}^{DL}$ refers to downlink bandwidth configuration and $N_{sc}^{RB}$ refers to resource block size in the frequency domain that is expressed as a number of subcarriers, $n_{CCE,j}$ is a number of the first control channel element (CCE) used for transmission of the corresponding PDCCH in Type 1 DL subframe j, and $j (0 \leq j < M_1)$ is the index of the Type 1 DL subframe, and $M_1$ is a number of Type 1 DL subframes.

13. The method of claim 12, further comprising performing PUCCH resource mapping for PDSCH transmission indicated via PDCCH on the Type 1 DL subframe based on:

$$n_{PUCCH,j}^{(1)} = (M_1-j-1) \cdot N_c + j \cdot N_{c+1} + n_{CCE,j} + N_{PUCCH}^{(1)} + \Delta_{ARO}$$

where $j (0 \leq j < M_1)$ is the index of the Type 1 DL subframe, and $\Delta_{ARO}$ refers to HARQ-ACK resource offset value that is selected from predefined values based on 2-bits HARQ-ACK resource offset field in a downlink control information (DCI) format depending on a number of Type 1 DL subframes associated with the first UL subframe for HARQ-ACK transmission.

14. The method of claim 13, further comprising determining the HARQ-ACK offset $\Delta_{ARO}$ for the Type 1 DL subframe based on 2-bits HARQ-ACK resource offset field in the DCI format of the corresponding PDCCH depending on the number of Type 1 DL subframes associated with the first UL subframe for HARQ-ACK transmission:
selecting a $\Delta_{ARO}$ value out of $\{0, -1, -2, 2\}$ when the number of Type 1 DL subframes is one; and
selecting a value out of $\{0, \Delta_1-1, \Delta_2-2, 2\}$ when the number of Type 1 DL subframes is more than one, where $\Delta_1$ or $\Delta_2$ could be one of $\{0, -(M_1-j-1) \cdot N_c - j \cdot N_{c+1}, -M_1 \cdot (N_c-N_{c-1}), -j \cdot (N_{c+1}-N_c), -(N_{c+1}-N_c), -M_1 \cdot N_c\}$, and $j (0 \leq j < M_1)$ is the index of the Type 1 DL subframe, and $M_1$ is the number of Type 1 DL subframes, and c is selected from $\{0, 1, 2, 3\}$ such that $<N_c \leq n_{CCE,j} < N_{c+1}, N_c = \max\{0, \lfloor [N_{RB}^{DL} \cdot (N_{sc}^{RB} \cdot c-4)]/36 \rfloor\}$.

15. The method of claim 11, further comprising performing PUCCH resource mapping for PDSCH transmission indicated via Physical Downlink Control Channel (PDCCH) on a Type 2 DL subframe based on higher-layer signaling or based on:

$$n_{PUCCH,l}^{(1)} = (M_2 - l - 1) \cdot N_c + l \cdot N_{c+1} + n_{CCE,l} + N_{PUCCH}^{(2)}$$

or $$n_{PUCCH,l}^{(1)} = l \cdot N_4 + n_{CCE,l} + N_{PUCCH}^{(2)}$$

or $$n_{PUCCH,l}^{(1)} = \sum_{c=0}^{l-1} \sum_{m=1}^{N_{CFI,c}} N_m + n_{CCE,l} + N_{PUCCH}^{(2)}$$

where $N_{PUCCH}^{(2)}$ is PUCCH resource offset associated with PDSCH on Type 2 DL subframes for PUCCH resource mapping, and c is selected from $\{0, 1, 2, 3\}$ such that $N_c \leq n_{CCE,l} < N_{c+1}$, $N_c = \max\{0, \lfloor [, N_{RB}^{DL} \cdot (N_{sc}^{RD} \cdot c-4)]/36 \rfloor\}$, $N_{RB}^{DL}$ refers to downlink bandwidth configuration and $N_{sc}^{RB}$ refers to resource block size in the frequency domain that is expressed as a number of subcarriers. $n_{CCE,l}$ is a number of the first channel control element (CCE) used for transmission of the corresponding PDCCH in Type 2 DL subframe l, and $l (0 \leq l < M_2)$ is the index of a Type 2 DL subframe and $M_2$ is a number of Type 2 DL subframes, and $N_{CFI,c}$ is detected Control Formal Indicator (CFI) value carried on Physical Control Format Indicator Channel (PC-FICH) channel in Type 2 subframe c.

16. The method of claim 15 wherein the PUCCH resource offset $N_{PUCCH}^{(2)}$ are configured by higher layer signal in a user equipment specific manner or a Cell-specific manner, or determined based on:

$$N_{PUCCH}^{(2)} = M_1 \cdot N_4$$

where $M_1$ is a number of Type 1 DL subframes associated with the first UL subframe for HARQ-ACK transmission, and $N_4$ refers to PUCCH resources reserved for a Type 1 DL subframe and is calculated according to $N_c = \max\{0, \lfloor [N_{RB}^{DL} \cdot (N_{sc}^{RB} \cdot c - 4)]/36 \rfloor\}$.

17. The method of claim 15, further comprising performing PUCCH resource mapping for PDSCH transmission on the Type 2 DL subframe via PDCCH based on:

$$n_{PUCCH,l}^{(1)} = (M_2 - l - 1) \cdot N_c + l \cdot N_{c+1} + n_{CCE,l} + N_{PUCCH}^{(2)} + \Delta_{ARO}$$

or $$n_{PUCCH,l}^{(1)} = l \cdot N_4 + n_{CCE,l} + N_{PUCCH}^{(2)} + \Delta_{ARO}$$

or $$n_{PUCCH,l}^{(1)} = \sum_{c=0}^{l-1} \sum_{m=1}^{N_{CFI,c}} N_m + n_{CCE,l} + N_{PUCCH}^{(2)} + \Delta_{ARO}$$

where $l(0 \leq l < M_2)$ is the index of the Type 2 DL subframe, and $\Delta_{ARO}$ refers to HARQ-ACK resource offset value that is selected based on 2-bits HARQ-ACK resource offset field in a downlink control information (DCI) format depending on the number of Type 2 DL subframes associated with the first UL subframe for HARQ-ACK transmission.

18. The method of claim 17, further comprising determining the HARQ-ACK offset for the Type 2 DL subframe based on 2-bits HARQ-ACK resource offset field in the DCI format of the corresponding PDCCH depending on the number of Type 2 DL subframes associated with the first UL subframe for HARQ-ACK transmission:

selecting a $\Delta_{ARO}$ value out of $\{0, -1, -2, 2\}$ when the number of Type 2 DL subframes is one;
selecting a $\Delta_{ARO}$ value out of $\{0, \Delta_1 - 1, \Delta_2 - 2, 2\}$ when the number of Type 2 DL subframes is more than one, where $\Delta_1$ or $\Delta_2$ could be one value of $$-(N_{PUCCH}^{(2)} - N_{PUCCH}^{(1)}), M_1 \cdot N_4, \sum_{c=0}^{M_1-1} \sum_{m=1}^{N_{CFI,c}} N_m\},$$

and $l(0 \leq l < M_2)$ is the index of the Type 2 DL subframe, and $M_1$ is the number of Type 1 DL subframes associated with the same first UL subframe for HARQ-ACK transmission and $M_2$ is the number of Type 2 DL subframes, and $N_{PUCCH}^{(1)}$ and $N_{PUCCH}^{(2)}$ is PUCCH resource offset associated with PDSCH on Type 1 DL subframes and Type 2 DL subframes respectively for PUCCH resource mapping, and c is selected from $\{0, 1, 2, 3\}$ such that is selected from $\{0, 1, 2, 3\}$ such that $N_c \leq n_{CCE,i} < N_{c+1}$, $N_c = \max\{0, \lfloor [N_{RB}^{DL} \cdot (N_{sc}^{RB} \cdot c - 4)]/36 \rfloor\}$, and $N_{CFI,c}$ is detected Control Formal Indicator (CFI) value carried on Physical Control Format Indicator Channel (PCFICH) channel in Type 2 subframe c.

19. The method of claim 11, further comprising performing PUCCH resource mapping for PDSCH transmission indicated via enhanced physical downlink control channel (EPDCCH) indicating downlink semi persistent scheduling (SPS) release in a Type 1 or Type 2 sub-frame, a user equipment (UE) shall use:

$$n_{PUCCH,i}^{(1)} = n_{ECCE,q} + \sum_{i1=0}^{i-1} N_{ECCE,q,n-k_{i1}} + \Delta_{ARO} + N_{PUCCH,q}^{(e1)}$$

when EPDCCH-physical resource block(PRB)-set q is configured for distributed transmission, or $$n_{PUCCH,i}^{(1)} = \left\lfloor \frac{n_{ECCE,q}}{N_{RB}^{ECCE,q}} \right\rfloor \cdot N_{RB}^{ECCE,q} + \sum_{i1=0}^{i-1} N_{ECCE,q,n-k_{i1}} + n' + \Delta_{ARO} + N_{PUCCH,q}^{(e1)}$$

when EPDCCH-PRB-set q is configured for localised transmission where $n_{ECCE,q}$ is the number of the first ECCE used for transmission of a corresponding downlink control information (DCI) assignment in EPDCCH-PRB-set q in subframe $n-k_i$, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q in subframe $n-k_i$ is given, and n' is determined from the antenna port used for EPDCCH transmission in subframe $n-k_i$, and $\Delta_{ARO}$ is the HARQ-ACK resource offset.

20. The method of claim 19, further comprising performing PUCCH resource mapping for PDSCH transmission indicated via EPDCCH or EPDCCH indicating downlink SPS release in the Type 1 or Type 2 sub-frame, the user equipment (UE) shall use:

$$n_{PUCCH,i}^{(1)} = \left\lfloor \frac{n_{ECCE,q}}{L_i} \right\rfloor + \sum_{i1=0}^{i-1} \left( \frac{N_{ECCE,q,n-k_{i1}}}{L_{i1}} \right) + \Delta_{ARO} + N_{PUCCH,q}^{(e1)}$$

or $$n_{PUCCH,i}^{(1)} = \left\lfloor \frac{n_{ECCE,q}}{L_i \cdot N_{RB}^{ECCE,q}} \right\rfloor \cdot N_{RB}^{ECCE,q} + \sum_{i1=0}^{i-1} \left( \frac{N_{ECCE,q,n-k_{i1}}}{L_{i1}} \right) + n' + \Delta_{ARO} + N_{PUCCH,q}^{(e1)}$$

where $L_i$ denotes the minimum supportable aggregation level in subframe i.

21. A non-transitory machine readable storage device having instructions to cause a machine to:
receive from a base station via a transceiver, a physical downlink shared channel (PDSCH) transmission;
classify, via processing circuitry, downlink (DL) subframe types for a set of DL subframes associated with a first uplink (UL) subframe for transmission of a hybrid automatic report request acknowledgment (HARQ-ACK); and
perform physical uplink control channel (PUCCH) resources mapping based on the classified DL subframe Types for an acknowledgement transmission associated with PDSCH transmission reception;
wherein the DL subframe types comprise:
Type 1 DL subframes that are constructed by DL subframes that are associated with the first uplink (UL) subframe for transmission of HARQ-ACK according to a time division duplex (TDD) UL/DL configuration indicated in a system information block Type 1(SIB1) message; and Type 2 DL subframes that are constructed by:
firstly identifying DL subframes that are associated with the first UL subframe for transmission of HARQ-ACK according to a higher layer configured DL-reference UL/DL configuration; and
when the Type 1 DL subframes are overlapped with the Type 2 DL subframes, the overlapping subframes between Type 1 and Type 2 DL subframes are further removed from the Type 2 DL subframes.

22. The machine readable storage device of claim 21 further having instructions to cause a machine to:
perform PUCCH resource mapping for PDSCH transmission indicated via enhanced physical downlink control channel (EPDCCH) indicating downlink semi persistent scheduling (SPS) release in a Type 1 DL subframe or a Type 2 DL sub-frame, the machine shall use:

$$n^{(1)}_{PUCCH,i} = n_{ECCE,q} + \sum_{i1=0}^{i-1} N_{ECCE,q,n-k_{i1}} + \Delta_{ARO} + N^{(e1)}_{PUCCH,q}$$

when EPDCCH-physical resource block(PRB)-set q is configured for distributed transmission, or $$n^{(1)}_{PUCCH,i} = \left\lfloor \frac{n_{ECCE,q}}{N^{ECCE,q}_{RB}} \right\rfloor \cdot N^{ECCE,q}_{RB} + \sum_{i1=0}^{i-1} N_{ECCE,q,n-k_{i1}} + n' + \Delta_{ARO} + N^{(e1)}_{PUCCH,q}$$

when EPDCCH-PRB-set q is configured for localised transmission where $n_{ECCE,q}$ is the number of the first ECCE used for transmission of a corresponding downlink control information (DCI) assignment in EPDCCH-PRB-set q in subframe $n-k_i$, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q in subframe $n-k_i$ is given, and n' is determined from the antenna port used for EPDCCH transmission in subframe $n-k_i$, and $\Delta_{ARO}$ is the HARQ-ACK resource offset; and perform PUCCH resource mapping for PDSCH transmission indicated via EPDCCH or EPDCCH indicating downlink SPS release in the Type 1 or Type 2 subframe, the machine shall use:

$$n^{(1)}_{PUCCH,i} = \left\lfloor \frac{n_{ECCE,q}}{L_i} \right\rfloor + \sum_{i1=0}^{i-1} \left( \frac{N_{ECCE,q,n-k_{i1}}}{L_{i1}} \right) + \Delta_{ARO} + N^{(e1)}_{PUCCH,q}$$

or $$n^{(1)}_{PUCCH,i} = \left\lfloor \frac{n_{ECCE,q}}{L_i \cdot N_{RB}^{ECCE,q}} \right\rfloor \cdot N_{RB}^{ECCE,q} + \sum_{i1=0}^{i-1} \left( \frac{N_{ECCE,q,n-k_{i1}}}{L_{i1}} \right) + n' + \Delta_{ARO} + N^{(e1)}_{PUCCH,q}$$

where $L_i$ denotes the minimum supportable aggregation level in subframe i.

* * * * *